US010824531B2

(12) United States Patent
Khoury et al.

(10) Patent No.: US 10,824,531 B2
(45) Date of Patent: Nov. 3, 2020

(54) LENDING TARGET DEVICE RESOURCES TO HOST DEVICE COMPUTING ENVIRONMENT

(71) Applicant: Microsoft Technology Licensing, LLC, Redmond, WA (US)

(72) Inventors: Issa Y. Khoury, Redmond, WA (US); Darren Ray Davis, Woodinville, WA (US); Petteri Mikkola, Bellevue, WA (US); Elizabeth Fay Threlkeld, Redmond, WA (US); Kenton Allen Shipley, Woodinville, WA (US); Keri Kruse Moran, Bellevue, WA (US); Ramrajprabu Balasubramanian, Renton, WA (US); Patrick Derks, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/016,244

(22) Filed: Jun. 22, 2018

(65) Prior Publication Data
US 2018/0300213 A1 Oct. 18, 2018

Related U.S. Application Data

(62) Division of application No. 14/495,355, filed on Sep. 24, 2014, now Pat. No. 10,025,684.

(51) Int. Cl.
*G06F 11/30* (2006.01)
*G06F 13/10* (2006.01)
(Continued)

(52) U.S. Cl.
CPC ........ *G06F 11/3051* (2013.01); *G06F 9/5011* (2013.01); *G06F 9/5077* (2013.01);
(Continued)

(58) Field of Classification Search
CPC .. G06F 11/3041; G06F 11/3051; G06F 13/10; G06F 13/4068; G06F 2209/503;
(Continued)

(56) References Cited

U.S. PATENT DOCUMENTS

| 5,880,732 A | 3/1999 | Tryding |
| 6,748,195 B1 | 6/2004 | Phillips |

(Continued)

FOREIGN PATENT DOCUMENTS

| CN | 1782997 A | 6/2006 |
| CN | 101052939 A | 10/2007 |

(Continued)

OTHER PUBLICATIONS

Baur et al., "Virtual Projection: Exploring Optical Projection as a Metaphor for Multi-Device Interaction," In Proceedings of the SIGCHI Conference on Human Factors in Computing Systems, May 5, 2012, pp. 1693-1702; http://dl.acm.org/citation.cfm?id=2208297.

(Continued)

*Primary Examiner* — Idriss N Alrobaye
*Assistant Examiner* — Richard B Franklin
(74) *Attorney, Agent, or Firm* — NovoTechIP International PLLC

(57) ABSTRACT

Various models may enable a first device to share a device resource with a second device in various contexts, such as sharing computing sessions via terminal services; sharing displays via display mirroring; and sharing input components across devices. However, such techniques often utilize ad hoc sharing models that depend on configuration and/or administrative access of each device; limit the capabilities of such sharing; and/or exhibit security concerns. Instead, a target device may advertise an availability of a target device resource. A host device may request the target device to lend (Continued)

the target device resource to the computing environment of the host device. The target device may reserve the target device resource for the host device, which may then integrate the target device resource into the host computing environment. The model may enable the user to utilize resources even from target devices that the user is not otherwise permitted to use.

10 Claims, 9 Drawing Sheets

(51) Int. Cl.
  *G06F 13/40* (2006.01)
  *G06F 9/50* (2006.01)
(52) U.S. Cl.
  CPC .......... *G06F 11/3041* (2013.01); *G06F 13/10* (2013.01); *G06F 13/4068* (2013.01); *G06F 2209/503* (2013.01)
(58) Field of Classification Search
  CPC .... G06F 9/5011; G06F 9/5077; G06F 3/1454; G06F 9/4445
  See application file for complete search history.

(56) References Cited

U.S. PATENT DOCUMENTS

| | | | |
|---|---|---|---|
| 6,856,960 | B1 | 2/2005 | Dragosh et al. |
| 6,941,356 | B2 | 9/2005 | Meyerson |
| 6,952,676 | B2 | 10/2005 | Sherman et al. |
| 6,973,535 | B2 | 12/2005 | Bruner et al. |
| 7,345,671 | B2 | 3/2008 | Robbin et al. |
| 7,392,193 | B2 | 6/2008 | Mault |
| 7,437,183 | B2 | 10/2008 | Makinen |
| 7,523,226 | B2 | 4/2009 | Anderson et al. |
| 7,574,469 | B2 | 8/2009 | Lorencz |
| 7,574,691 | B2 | 8/2009 | Freitas et al. |
| 7,716,273 | B2 | 5/2010 | Soin |
| 7,840,509 | B1 | 11/2010 | Messina |
| 7,937,075 | B2 | 5/2011 | Zellner |
| 7,962,552 | B2 | 6/2011 | Clark |
| 8,028,239 | B1 | 9/2011 | Al-hilali et al. |
| 8,041,296 | B2 | 10/2011 | Skog et al. |
| 8,150,945 | B2 | 4/2012 | Karaoguz et al. |
| 8,161,403 | B2 | 4/2012 | Lyle et al. |
| 8,185,539 | B1 | 5/2012 | Bhardwaj |
| 8,194,037 | B2 | 6/2012 | Kerr et al. |
| 8,244,288 | B2 | 8/2012 | Chipchase |
| 8,354,997 | B2 | 1/2013 | Boillot |
| 8,418,072 | B1 | 4/2013 | Bauer |
| 8,453,186 | B2 | 5/2013 | Roberts et al. |
| 8,462,896 | B2 | 6/2013 | Suga et al. |
| 8,504,936 | B2 | 8/2013 | Gimpl et al. |
| 8,515,413 | B1 | 8/2013 | Schilit et al. |
| 8,520,000 | B2 | 8/2013 | Duncker et al. |
| 8,520,810 | B1 | 8/2013 | Reding et al. |
| 8,538,324 | B2 | 9/2013 | Hardacker et al. |
| 8,538,401 | B2 | 9/2013 | Kim et al. |
| 8,549,425 | B2 | 10/2013 | Sakamoto |
| 8,711,552 | B2 | 4/2014 | Medica et al. |
| 8,736,762 | B2 | 5/2014 | Luo et al. |
| 8,762,896 | B2 | 6/2014 | Lee et al. |
| 9,081,498 | B2 | 7/2015 | Thorsander et al. |
| 9,357,250 | B1 | 5/2016 | Newman et al. |
| 9,395,905 | B2 | 7/2016 | Wherry |
| 9,405,459 | B2 | 8/2016 | Sirpal et al. |
| 9,448,811 | B2 | 9/2016 | Culshaw et al. |
| 9,678,640 | B2 | 6/2017 | Stauber et al. |
| 9,721,570 | B1 | 8/2017 | Beal et al. |
| 9,769,227 | B2 | 9/2017 | Threlkeld et al. |
| 9,860,306 | B2 | 1/2018 | Threlkeld et al. |
| 9,912,724 | B2 | 3/2018 | Liu et al. |
| 10,025,684 | B2 | 7/2018 | Khoury et al. |
| 2002/0054141 | A1 | 5/2002 | Yen et al. |
| 2002/0161891 | A1 | 10/2002 | Higuchi et al. |
| 2003/0018725 | A1* | 1/2003 | Turner .............. H04L 51/04 709/206 |
| 2003/0036927 | A1 | 2/2003 | Bowen |
| 2003/0055735 | A1 | 3/2003 | Cameron et al. |
| 2003/0055738 | A1 | 3/2003 | Alie |
| 2003/0164818 | A1 | 9/2003 | Miller-Smith |
| 2003/0189597 | A1 | 10/2003 | Anderson et al. |
| 2003/0214458 | A1 | 11/2003 | Giemborek et al. |
| 2004/0002049 | A1 | 1/2004 | Beavers et al. |
| 2006/0010394 | A1 | 1/2006 | Chaudhri et al. |
| 2006/0203758 | A1 | 9/2006 | Tee et al. |
| 2006/0236255 | A1 | 10/2006 | Lindsay et al. |
| 2007/0004385 | A1 | 1/2007 | Horvitz et al. |
| 2007/0083911 | A1 | 4/2007 | Madden et al. |
| 2007/0113190 | A1 | 5/2007 | Clark et al. |
| 2007/0236475 | A1 | 10/2007 | Wherry |
| 2007/0299796 | A1 | 12/2007 | Macbeth et al. |
| 2008/0005693 | A1 | 1/2008 | Oliver et al. |
| 2008/0036743 | A1 | 2/2008 | Westerman et al. |
| 2008/0080688 | A1 | 4/2008 | Burgan et al. |
| 2008/0084400 | A1 | 4/2008 | Rosenberg |
| 2008/0226119 | A1 | 9/2008 | Candelore et al. |
| 2008/0248834 | A1 | 10/2008 | Chaterjee et al. |
| 2008/0250408 | A1 | 10/2008 | Tsui et al. |
| 2008/0250424 | A1 | 10/2008 | Brugiolo et al. |
| 2008/0305742 | A1 | 12/2008 | Basir |
| 2008/0305743 | A1 | 12/2008 | Basir |
| 2009/0006660 | A1 | 1/2009 | Bawcutt et al. |
| 2009/0037832 | A1 | 2/2009 | Falchuk et al. |
| 2009/0113346 | A1 | 4/2009 | Wickramasuriya et al. |
| 2009/0153288 | A1 | 6/2009 | Hope et al. |
| 2009/0170552 | A1 | 7/2009 | Lin |
| 2009/0207097 | A1 | 8/2009 | Sherman et al. |
| 2009/0210481 | A1 | 8/2009 | Fletcher et al. |
| 2009/0231271 | A1 | 9/2009 | Heubel et al. |
| 2009/0307658 | A1 | 12/2009 | Freitas et al. |
| 2009/0322693 | A1 | 12/2009 | Sasakura |
| 2010/0060588 | A1 | 3/2010 | Fong |
| 2010/0064228 | A1 | 3/2010 | Tsem |
| 2010/0088100 | A1 | 4/2010 | Lindahl |
| 2010/0138780 | A1 | 6/2010 | Marano et al. |
| 2010/0211636 | A1 | 8/2010 | Starkenburg et al. |
| 2010/0299436 | A1 | 11/2010 | Khalid et al. |
| 2010/0304783 | A1 | 12/2010 | Logan et al. |
| 2011/0024691 | A1 | 2/2011 | French et al. |
| 2011/0033971 | A1 | 2/2011 | Koo et al. |
| 2011/0055774 | A1 | 3/2011 | Kim et al. |
| 2011/0066971 | A1 | 3/2011 | Forutanpur et al. |
| 2011/0126119 | A1 | 5/2011 | Young et al. |
| 2011/0130178 | A1 | 6/2011 | Shin et al. |
| 2011/0131291 | A1 | 6/2011 | Hon-anderson |
| 2011/0145817 | A1 | 6/2011 | Grzybowski |
| 2011/0154268 | A1 | 6/2011 | Trent et al. |
| 2011/0185369 | A1 | 7/2011 | Huang |
| 2011/0205159 | A1 | 8/2011 | Gates et al. |
| 2011/0209069 | A1 | 8/2011 | Mohler |
| 2011/0214162 | A1 | 9/2011 | Brakensiek et al. |
| 2011/0221765 | A1 | 9/2011 | Nason et al. |
| 2011/0230178 | A1 | 9/2011 | Jones et al. |
| 2011/0231550 | A1 | 9/2011 | Murray et al. |
| 2011/0231796 | A1 | 9/2011 | Vigil |
| 2011/0231853 | A1 | 9/2011 | Murray et al. |
| 2011/0246891 | A1 | 10/2011 | Scubert et al. |
| 2011/0246904 | A1 | 10/2011 | Pinto et al. |
| 2011/0271198 | A1 | 11/2011 | Brakensiek et al. |
| 2011/0307841 | A1 | 12/2011 | Boldyrev et al. |
| 2011/0320535 | A1 | 12/2011 | Donaldson |
| 2012/0017147 | A1 | 1/2012 | Mark |
| 2012/0050132 | A1 | 3/2012 | Lee |
| 2012/0054648 | A1 | 3/2012 | Morris |
| 2012/0095643 | A1 | 4/2012 | Bose et al. |
| 2012/0096167 | A1 | 4/2012 | Free et al. |
| 2012/0173983 | A1 | 7/2012 | Song |
| 2012/0174155 | A1 | 7/2012 | Mowrey |
| 2012/0176396 | A1 | 7/2012 | Harper et al. |
| 2012/0210266 | A1 | 8/2012 | Jiang et al. |
| 2012/0265528 | A1 | 10/2012 | Gruber et al. |

(56) References Cited

U.S. PATENT DOCUMENTS

| | | |
|---|---|---|
| 2012/0266079 A1 | 10/2012 | Lee et al. |
| 2012/0274863 A1 | 11/2012 | Chardon et al. |
| 2012/0282914 A1 | 11/2012 | Alexander |
| 2012/0296919 A1 | 11/2012 | Sinha et al. |
| 2012/0317236 A1 | 12/2012 | Abdo et al. |
| 2013/0018659 A1 | 1/2013 | Chi |
| 2013/0024778 A1 | 1/2013 | Reeves et al. |
| 2013/0027315 A1 | 1/2013 | Teng |
| 2013/0031261 A1 | 1/2013 | Suggs |
| 2013/0050222 A1 | 2/2013 | Moran et al. |
| 2013/0055102 A1 | 2/2013 | Matthews et al. |
| 2013/0057572 A1 | 3/2013 | Anderson et al. |
| 2013/0066895 A1 | 3/2013 | Choi et al. |
| 2013/0070844 A1 | 3/2013 | Malladi et al. |
| 2013/0073932 A1 | 3/2013 | Migos et al. |
| 2013/0076591 A1 | 3/2013 | Sirpal et al. |
| 2013/0103770 A1 | 4/2013 | Kamolz et al. |
| 2013/0109371 A1 | 5/2013 | Brogan et al. |
| 2013/0113993 A1 | 5/2013 | Dagit |
| 2013/0132481 A1 | 5/2013 | Lee et al. |
| 2013/0135195 A1 | 5/2013 | Josephson et al. |
| 2013/0143529 A1 | 6/2013 | Leppanen |
| 2013/0151989 A1 | 6/2013 | Dent et al. |
| 2013/0167159 A1 | 6/2013 | Ricci et al. |
| 2013/0179838 A1 | 7/2013 | LeVee et al. |
| 2013/0187861 A1 | 7/2013 | Lavalee |
| 2013/0204967 A1 | 8/2013 | Seo et al. |
| 2013/0207898 A1 | 8/2013 | Sullivan et al. |
| 2013/0214996 A1 | 8/2013 | Reeves et al. |
| 2013/0218947 A1 | 8/2013 | Zur et al. |
| 2013/0258037 A1 | 10/2013 | Kim et al. |
| 2013/0276015 A1 | 10/2013 | Fujimoto |
| 2013/0276030 A1 | 10/2013 | Fujimoto |
| 2013/0278484 A1 | 10/2013 | Hwang et al. |
| 2013/0283193 A1 | 10/2013 | Griffin |
| 2013/0283213 A1 | 10/2013 | Guendelman et al. |
| 2013/0288603 A1 | 10/2013 | Iwasaki |
| 2013/0297547 A1 | 11/2013 | Ding et al. |
| 2013/0326583 A1 | 12/2013 | Freihold et al. |
| 2013/0328667 A1 | 12/2013 | Kumar et al. |
| 2013/0332172 A1 | 12/2013 | Prakesh et al. |
| 2013/0332846 A1 | 12/2013 | Freedman |
| 2013/0335340 A1 | 12/2013 | Smith |
| 2013/0347018 A1 | 12/2013 | Limp et al. |
| 2014/0022192 A1 | 1/2014 | Hatanaka |
| 2014/0026068 A1 | 1/2014 | Park et al. |
| 2014/0028918 A1 | 1/2014 | Kim |
| 2014/0028921 A1 | 1/2014 | Moon et al. |
| 2014/0045433 A1 | 2/2014 | Kim |
| 2014/0051408 A1 | 2/2014 | Jenzowsky et al. |
| 2014/0098182 A1 | 4/2014 | Kramarenko et al. |
| 2014/0118222 A1 | 5/2014 | Barrett et al. |
| 2014/0129695 A1 | 5/2014 | Yerli |
| 2014/0164312 A1 | 6/2014 | Lynch et al. |
| 2014/0173529 A1 | 6/2014 | Hicks |
| 2014/0181639 A1 | 6/2014 | Lund et al. |
| 2014/0181715 A1 | 6/2014 | Axelrod et al. |
| 2014/0201636 A1 | 7/2014 | Freitas et al. |
| 2014/0215347 A1 | 7/2014 | Lin |
| 2014/0218289 A1 | 8/2014 | Dai et al. |
| 2014/0229858 A1 | 8/2014 | Bleker et al. |
| 2014/0244266 A1 | 8/2014 | Brown et al. |
| 2014/0244712 A1 | 8/2014 | Walters et al. |
| 2014/0244782 A1 | 8/2014 | Beaurepaire et al. |
| 2014/0249821 A1 | 9/2014 | Kennewick et al. |
| 2014/0267074 A1 | 9/2014 | Balci et al. |
| 2014/0282103 A1 | 9/2014 | Crandall |
| 2014/0304019 A1 | 10/2014 | Scott |
| 2014/0350936 A1 | 11/2014 | Kanai |
| 2014/0365336 A1 | 12/2014 | Hurewitz |
| 2015/0011277 A1 | 1/2015 | Wakeford et al. |
| 2015/0025976 A1 | 1/2015 | Guo et al. |
| 2015/0061842 A1 | 3/2015 | Yoon et al. |
| 2015/0066897 A1 | 3/2015 | Vronay et al. |
| 2015/0103015 A1 | 4/2015 | Berglund et al. |
| 2015/0138213 A1 | 5/2015 | Turner et al. |
| 2015/0169550 A1 | 6/2015 | Cvijetic et al. |
| 2015/0177860 A1 | 6/2015 | Imai |
| 2015/0234856 A1 | 8/2015 | Havekes et al. |
| 2015/0268807 A1 | 9/2015 | Truong et al. |
| 2015/0324067 A1 | 11/2015 | Cabral |
| 2015/0355715 A1 | 12/2015 | Smith |
| 2015/0355955 A1 | 12/2015 | Chakra et al. |
| 2015/0371364 A1 | 12/2015 | Park |
| 2015/0373065 A1 | 12/2015 | Holmquist et al. |
| 2016/0070461 A1 | 3/2016 | Herbordt et al. |
| 2016/0070580 A1 | 3/2016 | Johnson et al. |
| 2016/0085396 A1 | 3/2016 | Pendlay et al. |
| 2016/0085430 A1 | 3/2016 | Moran et al. |
| 2016/0085439 A1 | 3/2016 | Threkeld et al. |
| 2016/0085654 A1 | 3/2016 | Khoury et al. |
| 2016/0085698 A1 | 3/2016 | Mlkkola et al. |
| 2016/0086581 A1 | 3/2016 | Khoury et al. |
| 2016/0088040 A1 | 3/2016 | Threlkeld et al. |
| 2016/0088060 A1 | 3/2016 | Rahman et al. |
| 2016/0162151 A1 | 6/2016 | Xu |
| 2016/0261921 A1 | 9/2016 | Malko |
| 2016/0267546 A1 | 9/2016 | Marsh |
| 2018/0007104 A1 | 1/2018 | Thelkeld et al. |

FOREIGN PATENT DOCUMENTS

| | | |
|---|---|---|
| CN | 101101604 A | 1/2008 |
| CN | 101582053 A | 11/2009 |
| CN | 101981557 A | 2/2011 |
| CN | 102027450 A | 4/2011 |
| CN | 102176762 A | 9/2011 |
| CN | 102541548 A | 7/2012 |
| CN | 102725727 A | 10/2012 |
| CN | 102835068 A | 12/2012 |
| CN | 102866913 A | 1/2013 |
| CN | 102945149 A | 2/2013 |
| CN | 103412712 A | 11/2013 |
| CN | 103733170 A | 4/2014 |
| EP | 1942401 | 7/2008 |
| EP | 2000894 | 12/2008 |
| EP | 2509292 | 10/2012 |
| EP | 2632131 | 8/2013 |
| EP | 2701044 | 2/2014 |
| EP | 2712152 | 3/2014 |
| FR | 2 996 086 | 3/2014 |
| JP | 2006127279 A | 5/2006 |
| JP | 2006330912 A | 12/2006 |
| JP | 2007179108 A | 7/2007 |
| JP | 2008244974 A | 10/2008 |
| JP | 2014063449 A | 4/2014 |
| RU | 2355121 | 5/2009 |
| RU | 2405186 C2 | 11/2010 |
| RU | 2417391 | 4/2011 |
| RU | 2011146922 | 7/2013 |
| WO | WO 2009143294 | 11/2009 |
| WO | 2012144632 A1 | 10/2012 |
| WO | 2013012654 A | 1/2013 |
| WO | 2013012654 A2 | 1/2013 |
| WO | WO2013112143 | 8/2013 |
| WO | WO 2013171487 | 11/2013 |
| WO | WO 2013/184394 | 12/2013 |
| WO | WO 2014038918 | 3/2014 |

OTHER PUBLICATIONS

Seifert et al., "Extending Mobile Interfaces with External Screens," In Proceedings of International Federation for Information Processing, Sep. 2, 2013, pp. 722-729, https://www.uni-ulm.de/fileadmin/website_uni_ulm/iui.inst.100/institu/Papers/Prof_Rukzio/2013/2013-Seifert-et-al_ExtendingMobileInterfaces.pdf.

Greenberg et al., "PDAs and Shared Public Displays: Making Personal Information Public, and Public Information Personal" In Proceedings of Personal Technologies, vol. 3, Issue 1-2, Jun. 30, 2014, pp. 54-64, http://grouplab.cpsc.ucalgary.ca/grouplab/uploads/Publications/Publications/1999-PDAs.PersoanlTechnologies.pdf.

(56) References Cited

OTHER PUBLICATIONS

Grolaux, et al., "Attach me, Detach me, Assemble me like you work," In Proceedings of Human-Computer Interaction-Interact, Sep. 12, 2005, 14 pages, http://www.infor.ucl.ac.be/~pvr/Grolaux-Interact2005.pdf.

Schmidt et al., "A Cross-Device Interaction Style for Mobiles and Surfaces," In Proceedings of the Designing Interactive Systems Conference, Jun. 11, 2012, pp. 318-327, http://dl.acm.org/citation.cfm?id=2318005.

"SlingPlayer for Connected Devices," Published on Jun. 25, 2014, 3 pages, available at: http:/www.slingbox.com/go/spcd.

International Search Report and Written Opinion from corresponding International Application No. PCT/US215/050317, dated Feb. 16, 2016, 25 pages.

Wang et al., "Dynamic Cloud Resource Reservation via Cloud Brokerage," Proceedings of the International Conference on Distributed Computing Systems, IEEE Computer Society, US, Jul. 8, 2013, pp. 400-409.

Second Written Opinion received in counterpart PCT Application No. PCT/US2015/050317, dated Aug. 18, 2016, 6 pages.

Reply Written Opinion cited in PCT Application No. PCT/US2015/050664 dated Jun. 22, 2016, 5 pages.

Reply Written Opinion cited in PCT Application No. PCT/US2015/050690, dated Apr. 8, 2016, 8 pages.

Second Written Opinion cited in PCT Application No. PCT/US2015/050690 dated May 27, 2016, 4 pages.

Reply Written Opinion cited in PCT Application No. PCT/US2015/050838 dated Jun. 24, 2016, 23 pages.

Reply Written Opinion cited in PCT Application No. PCT/US2015/050846 dated May 19, 2016.

Reply Written Opinion cited in PCT Application No. PCT/US2015/050866, dated May 2, 2016, 20 pages.

Reply Written Opinion cited in PCT Application No. PCT/US2015/051133 dated Jul. 22, 2016, 24 pages.

Non-Final Office Action cited in U.S. Appl. No. 14/495,443 dated Aug. 26, 2016, 44 pages.

Int. Search Report/Written Opinion cited in PCT Application No. PCT/2015/050664 dated Nov. 27, 2015, 13 pages.

Int. Search Report/Written Opinion cited in PCT Application No. PCT/US2015/050690 dated Nov. 25, 2015, 10 pages.

Int. Search Report/Written Opinion cited in PCT Application No. PCT/US2015/050838 dated Jan. 13, 2016, 14 pages.

Int. Search Report/Written Opinion cited in PCT Application No. PCT/US2015/050846 dated Jan. 5, 2016, 12 pages.

Int. Search Report/Written Opinion cited in PCT Application No. PCT/US2015/050866 dated Jan. 8, 2016, 14 pages.

Int. Search Report/Written Opinion cited in PCT Application No. PCT/US2015/051133 dated Jan. 13, 2016, 14 pages.

"Google I/O 2014: Android Takes the L," Jun. 25, 2014, reprinted from the Internet at http://winsupersite.com/mobile-devices/google-io-2014-android-takes-1 11 pages.

"Considering CarPlay," Mar. 5, 2014, reprinted from the Internet at: http://getwired.com/2014/03/05/considering-carplay/, 4 pages.

"Holy Smartphones and Tablets, Batman! Mobile Interaction's Dynamic Duo," Tommaso Piazza, Morten Fjelt, Gonzalo Ramos Asimevren Yantac and Shendong Zhao, Sep. 24, 2013, In Proceedings of the 11th Asia Pacific Conference on Computer Human Interaction, reprinted from the Internet at: http://t2i.se/wp-content/uploads/2014/01/APCHI_2013_v20.pdf, pp. 63-72.

"Multiple TV remotes showcases the evils of complexity. Smart TVs just make it worse," Jan. 13, 2014, reprinted from the Internet at: http://praxtime.com/2014/01/13/multiple-remotes-evil/, 4 pages.

"Bimodal tablets (Windows and Android)," Jan. 14, 2005, reprinted from the Internet at: http://getwired.com/2014/01/05/bimodal-tablets-windows-and-android-remember-them-when-theyre-gone-again/, 23 pages.

"MobiToss: A Novel gesture based interface for creating and sharing mobile multimedia art on large public displays," Jurgen Scheible, Timo Ojala and Paul Coulton, Oct. 26, 2008, In Proceedings of Multimedia, reprinted from the Internet at: http://www.mediateam.oulu.fi/publications/pdf/1131.pdf, pp. 957-960.

"Throw and Tilt—Seamless Interaction across Devices Using Mobile Phone Gestures," Raimund Dachselt and Robert Buchholz, Sep. 22, 2008, In Proceedings of 2nd Workshop on Mobile and embedded Interactive Systems, reprinted from the Internet at: https://imld/de/cnt/uplaods/2008-MEIS-Throw-and-Tilt.pdf. pp. 272-278.

"Up close with iOS 5: New gestures," Alexandra Chang, Oct. 14, 2011, reprinted from the Internet at: http://www.macworld.com/article/1163019/ios_5_new_gestures.html, 5 pages.

"Chromecast," Jul. 3, 2014, reprinted from the Internet at: www.goog.ecom/intl/en/chrome/devices/chromecase/, 6 pages.

"What is Ubuntu for Android?," Jul. 3, 2014, reprinted from the Internet at: http://ubuntu.com/phone/ubuntu-for-android, 9 pages.

"In-Car Entertainment using Mobile Devices: A study on Automotive Manufactures in India," S. Solamalai and Dr. N.R.V. Prabhu, Jun. 30, 2014, In International Journal of Engineering Science and Technology, vol. 2, No. 1, reprinted from the Internet at: http://www.estij.org/papers/vol2no12012/4vol2no1/pdf., pp. 26-29.

"Google Chromecast controls TV from smartphones, tablets, laptops," Jul. 24, 2013, reprinted from the Internet at: http://www.computerworld.com/article/2484298/tablets/google-chromecast-controls-tv-from-smartphones-tablets-laptops.html, 5 pages.

"Share Android Device Screen with Other Devices," Albert Tang, Dec. 17, 2012, reprinted from the Internet at: http://www.youtube.com/watch?v=Ygng30ir1tc, 4 pages.

"Kyocera's Echo phone bring dual-screens and "Simul-Taking" to Spring," Davindra Hardawar, Feb. 8, 2011, reprinted from the Internet at: http://venturebeat.com/2011/02/08/kyocera-echo/, 4 pages.

"Design A for P2," Jan. 15, 2013, reprinted from the Internet at http://boards.openpandora.org/topic/11608-design-a-for-p2, 6 pages.

"OSX Mavericks Preview: Multiple displays finally work like they're supposed to," Peter Cohen, Jul. 8, 2013, reprinted from the Internet at: http://www.imore.com/os-x-maverickes-preview-multiple-displays, 8 pages.

"Separate Back Stack for each tab in Android using Fragments," May 18, 2013, reprinted from the Internet at: http://stackoverflow.com/questions/6987334/separate-back-stack-for-each-tab-in-android-using-fragments, 15 pages.

"Spring Echo—Dual Screen Simul-tasking Phone," Feb. 10, 2011, reprinted from the Internet at: http://www.unp.me/f106/sprint-echo-dual-screen-simul-tasking-phone-139170/, 3 pages.

"Creating Separate Back Stacks for Android Application Tabs using Fragments," Apr. 30, 2013, reprinted from the Internet at: http://www.abtosoftware.com/blog/creating-separate-back-stacks-for-android-apps-tabs-using-fragmentsm, 3 pages.

"Providing Proper Back Navigation," May 18, 2013, reprinted from the Internet at: http://developer.android.com/training/implementing-naviagation/temporal.html, 4 pages.

"Building for Multiple Screens," Oct. 18, 2013, reprinted from the Internet at: http://tech.infospace.com/2013/10/18/building-for-multiple-screens/, 5 pages.

"User Interfaces When and Where They are Needed: an Infrastructure for Recombinant Computing," Mark W. Newman, Sharhram Izadi, W. Keith Edwards, Jana Z. Sedivy and Trevor F. Smith, Oct. 27, 2002, In Proceeding of the 15th Annual ACM Symposium on User Interface Software and Technology, vol. 4, Issue 2, reprinted from the Internet at: http://mwnewman.people.si.umich.edu/pubs/uist2002-controllers.pdf, pp. 171-180.

"Multimodal user interfaces for context-aware-mobile applications," Ralf Kernchen, Peter Pal Boda, Klaus Moessner, Bernd Mrohs, Matthieu Boussard and Giovanni Giuliani, Sep. 11, 2005, in IEEE 16ht International Symposium on Personal, Indoor and Mobile Radio Communications, vol. 4, reprinted from the Internet at: ieeexplore.ieee/org/stamp.stamp.jsp?tp=&arnumber+1651849, 6 pages.

"Stanford Interactive Workspaces: A Framework for Physical and Graphical User Interface Prototyping," Jan Borchers, Meredity Ringel, Joshua Tyler and Armando Fox, Dec. 2012, In IEEE Wireless Communication, reprinted from the Internet at: https://hci.stanford.edu/publications/2002/iwork_prototype_ieee/iRoom_SmartHomes_final.pdf, 7 pages.

"Managing Context Information in Mobile Devices," Panu Korpipaa, Jani Manty Jarvi, Juha Kela, Heikki Keranen and Esko-Juhani

(56) References Cited

OTHER PUBLICATIONS

Malm, Jul. 1, 2013, IEEE Pervasive Computing, vol. 3, Issue 2, reprinted from the Internet at: http://140.127.22.92/download/learn_web/tong(93-2)-Distribution_multimedia/database/6-7/managing_context_information_in_mobile_devices.pdf, pp. 42-51.
"Implicit Human Computer Interaction Through Context," Albrecht Schmidt, Jan. 1, 2000, personal Technologies, vol. 4, No. 2-3, 10 pgs.
"Design of human-centric adaptive multimodal interfaces," J. Kong, W.Y. Zhang, N. Yu and X.J. Xia, Jul. 28, 2011, International Journal of Human-Computer Studies, Academic Press, New York, NY, vol. 69, No. 12, 16 pages.
"A Unifying Reference Framework for multi-target user interfaces," Gaelle Calvary, Joelle Coutaz, David Thevenin, Quentin Limbourg, Laurent Bouillon and Jean Vanderdoncki Jun. 2003, Interacting with Computers, vol. 15, No. 3, pp. 289-308.
International Preliminary Report on Patentability, received in counterpart PCT Application No. PCT/US2015/050317, dated Dec. 6, 2016, 7 pages.
Schoone, "Sharing files with a mapped network drive," Feb. 1, 2012, http://web.archive.org/web/20120201105002/http://www.optimizingpc.com/miscellaneous.sharing_files_shared_folder.html, pp. 1-4 (year 2012).
Rusen, "How to Work with Network Drives & Network Locations," Apr. 16, 2014, https://www.howtogeek.com/school/windows-network-sharing/lesson8/all/ pp. 1-25 (Year 2014).
Microsoft SMD Protocol Packet Exchange Scenario, Jul. 31, 2012, http://web.archive.org/web/20120731231956/https://msdn.microsoft.com/en-us/library/windows/desktop/aa365236(v=vs.85).aspx. p. 1-3 (Year 2012).
"Chromecast", Retrieved From: https://www.google.com/intl/en/chrome/devices/chromecast, Retrieved Date: Mar. 7, 2014, 4 Pages.
"Creating Separate Back Stacks for Android Application Tabs using Fragments", Retrieved From: https://www.abtosoftware.com/blog/creating-separate-back-stacks-for-android-apps-tabs-using-fragments, Apr. 30, 2013, 3 Pages.
"iDisplay: extra monitor for your Mac or PC", Retrieved From: https://web.archive.org/web/20160110104523/http://www.getdisplay.com/, Nov. 1, 2013, 3 Pages.
"In every dual-core phone, there's a PC trying to get out", Retrieved From: https://web.archive.org/web/20130417120250/https://www.ubuntu.com/phone/ubuntu-for-android, Retrieved Date: Sep. 25, 2013, 8 Pages.
"SlingPlayer for Connected Devices", Retrieved From: http://forms.sling.com/go/spcd, Jun. 25, 2014, 3 Pages.
"The PadFone is not the future", Retrieved From: http://getwired.com/2013/04/14/1471/, Apr. 14, 2013, 3 Pages.
"Touch Mouse—iPhone/iPod Touch", Retrieved From: https://www.youtube.com/watch?v=iCI7iKv91GE, Feb. 1, 2010, 5 Pages.
"Xperia Z: Experience the best of Sony in a smartphone", Retrieved From:http://www.sony.com.au/microsite/xperia-z/?, Feb. 17, 2013, 11 Pages.
"Office Action Issued in European Patent Application No. 15775022.5", dated Jun. 22, 2018, 8 Pages.
"Office Action Issued in European Patent Application No. 15775852.5", dated Apr. 5, 2018, 5 Pages.
"Office Action Issued in European Patent Application No. 15775856.6", dated May 29, 2018, 6 Pages.
Cass, Stephen, "Big fridge is watching you [smart technologies monitoring food From production to consumption]", In Proceedings of the Spectrum, IEEE vol. 50, Issue 6, Jun. 1, 2013, pp. 88-88.
Cohen, Peter, "OSX Mavericks Preview: Multiple Displays Finally Work Like They're Supposed to", Retrieved From http://www.imore.com/os-x-mavericks-preview-multiple-displays, Jul. 8, 2013, 8 Pages.
Dachis, Adam, "How to Automatically Unlock Your Gadgets Without a Password", Retrieved From: https://lifehacker.com/how-to-make-your-smartphone-automatically-unlock-your-s-510592193, Jun. 3, 2013, 9 Pages.
Etherington, Darrell, "Mosaic Lets You Weave a Single Display From Multiple iPhones and iPads, Offers SDK for Developers", Retrieved From: https://techcrunch.com/2013/04/02/mosaic-lets-you-weave-a-single-display-From-multiple-iphones-and-ipads-offers-sdk-for-developers/, Apr. 2, 2013, 7 Pages.
Heape, Judd, "Driving an External Monitor From Handhelds", In Proceedings of the EE Times-India, Mar. 2008, 2 Pages.
Martin, B R., "Separate Back Stack for Each Lab in Android using Fragments", Retrieved From http://stackoverflow.com/questions/6987334/separate-back-stack-for-each-lab-in-android-using-fragments, May 18, 2013, 17 pages.
"Second Written Opinion Issued in PCT Application No. PCT/2015/051133" (shares priority date), dated Sep. 7, 2016, 12 Pages.
"International Preliminary Report on Patentability Issued in PCT Application No. PCT/US2015/048748", dated Oct. 6, 2016, 8 Pages.
"International Search Report & Written Opinion Issued in PCT Application No. PCT/US2015/048748", dated Dec. 11, 2015, 14 Pages.
"Second Written Opinion Issued in PCT Application No. PCT/US2015/048748", dated Jul. 4, 2016, 7 Pages.
"International Preliminary Report on Patentability Issued in PCT Application No. PCT/US2015/050319" (shares priority date), dated Jul. 18, 2016, 10 Pages.
"International Search Report & Written Opinion Issued in PCT Application No. PCT/US2015/050319", dated Dec. 3, 2015, 10 Pages.
"Second Written Opinion Issued in PCT Application No. PCT/US2015/050319", dated May 27, 2016, 8 Pages.
"Second Written Opinion Issued in PCT Application No. PCT/US2015/050664" (shares priority date), dated Sep. 19, 2016, 5 Pages.
"International Preliminary Report on Patentability Issued in PCT Application No. PCT/US2015/050690" (shares priority date), dated Dec. 1, 2016, 6 Pages.
"International Preliminary Report on Patentability Issued in PCT Application No. PCT/US2015/050838" (shares priority date), dated Dec. 12, 2016, 8 Pages.
"Second Written Opinion Issued in PCT Application No. PCT/US2015/050838", dated Sep. 6, 2016, 8 Pages.
"International Preliminary Report on Patentability Issued in PCT Application No. PCT/US2015/050846" (shares priority date), dated Nov. 3, 2016, 8 Pages.
"Response to Written Opinion Issued in PCT Application No. PCT/US2015/050846", dated May 19, 2016, 25 Pages.
"Second Written Opinion Issued in PCT Application No. PCT/US2015/050846", dated Aug. 22, 2016, 6 Pages.
"International Preliminary Report on Patentability Issued in PCT Application No. PCT/US2015/050866" (shares priority date), dated Jan. 11, 2017, 13 Pages.
"Response to Written Opinion Filed in PCT Application No. PCT/US2015/050866", dated Mar. 18, 2016, 6 Pages.
"Second Written Opinion Issued in PCT Application No. PCT/US2015/050866", dated Aug. 1, 2016, 8 Pages.
"International Preliminary Report on Patentability Issued in PCT Application No. PCT/US2015/051128" (shares priority date), dated Dec. 19, 2016, 8 Pages.
"International Search Report & Written Opinion Issued in PCT Application No. PCT/US2015/051128", dated Dec. 2, 2015, 11 Pages.
"Second Written Opinion Issued in PCT Application No. PCT/US2015/051128", dated Sep. 5, 2016, 6 Pages.
International Preliminary Report on Patentability Issued in PCT Application No. PCT/US2015/051133, dated Dec. 2, 2016, 12 Pages.
"Second Written Opinion Issued in PCT Application No. PCT/US2015/051133", dated Sep. 7, 2016, 12 Pages.
Suk, et al., "Distributed Speech Recognition System for PDA in Wireless Network Environment", In Proceedings of the 9th Conference on Speech and Computer, Sep. 20-22, 2004, 4 Pages.
Tahir, et al., "ARemote: A Tangible Interface for Selecting TV Channels", in Proceedings of the IEEE 17th International Conference on Artificial Reality and Telexistence, Nov. 28, 2007, pp. 298-299, 2 pages.

(56) References Cited

OTHER PUBLICATIONS

Office Action from European Patent Application No. 15775022.5, dated Jan. 16, 2019, 7 Pages.
Office Action from European Patent Application No. 15775852.5, dated Feb. 19, 2019, 6 Pages.
Office Action received in European Patent Application No. 15775849.1, dated Oct. 16, 2018, 6 Pages.
Office Action received in European Patent Application No. 15775852.5, dated Sep. 3, 2018, 6 Pages.
Office Action received in European Patent Application No. 15779064.3 ("Gesture Navigation for Secondary User Interface"), dated Aug. 24, 2018, 5 Pages.
"Office Action Issued in Japanese Patent Application No. 2017511244", dated Jun. 5, 2019, 8 Pages.
"Office Action Issued in European Patent Application No. 15775848.3", dated Jun. 7, 2019, 4 Pages.
"Office Action Issued in European Patent Application No. 15775851.7", dated May 9, 2019, 6 Pages.
"Office Action Issued in Chinese Patent Application No. 201580051879.5", dated May 29, 2019, 42 Pages.
"Office Action Issued in Chinese Patent Application No. 201580051897.3", dated May 23, 2019, 15 Pages.
"Office Action Issued in Chinese Patent Application No. 201580051951.4", dated May 22, 2019, 17 Pages.
"Office Action Issued in Chinese Patent Application No. 201580051980.0", dated May 24, 2019, 34 Pages.
"Notice of Allowance Issued in Russian Patent Application No. 2017109690", dated Apr. 17, 2019, 25 Pages.
"Office Action Issued in Japanese Patent Application No. 2017-515807", dated Aug. 16, 2019, 4 Pages.
"First Office Action and Search Report Issued in Chinese Patent Application No. 201580051788.1", dated Jul. 29, 2019, 27 Pages.
Office Action from European Patent Application No. 15779062.7, dated Mar. 15, 2019, 8 Pages.
Notice of Allowance from Russian Patent Application No. 2017109699, dated Mar. 6, 2019, 21 Pages.
"Office Action Issued in Japanese Patent Application No. 2017511247", dated Jul. 9, 2019, 8 Pages.
"Office Action Issued in European Patent Application No. 15775857.4", dated Aug. 19, 2019, 8 Pages.
"First Office Action and Search Report Issued in Chinese Patent Application No. 201580051897.3", dated May 23, 2019, 15 Pages.
"First Office Action and Search Report Issued in Chinese Patent Application No. 201580051951.4", dated May 22, 2019, 17 Pages.
"First Office Action and Search Report Issued in Chinese Patent Application No. 201580051980.0", dated May 24, 2019, 34 Pages.
"First Office Action and Search Report Issued in Chinese Patent Application No. 201580051879.5", dated May 29, 2019, 42 Pages.
"Non Final Office Action Issued in U.S. Appl. No. 14/495,443", dated Aug. 19, 2019, 24 Pages.
"Final Office Action Issued in U.S. Appl. No. 14/495,228", dated Jul. 25, 2019, 25 Pages.
Office Action from counterpart European Patent Application No. 15779062.7, "Lending Target Device Resources to Host Device Computing Environment," dated Mar. 15, 2019, 8 pages.
"Non-Final Office Action Issued in U.S. Appl. No. 14/495,268", dated May 31, 2019, 16 Pages.
"Final Office Action Issued in U.S. Appl. No. 14/495,268", dated Oct. 4, 2019, 18 Pages.
"Final Office Action Issued in U.S. Appl. No. 14/495,443", dated Nov. 18, 2019, 26 Pages.
"Second Office Action and Search Report Issued in Chinese Patent Application No. 201580051821.0", dated Sep. 30, 2019, 10 Pages.
"Office Action Issued in Mexican Patent Application No. MX/a/2017/003837", dated Oct. 3, 2019, 4 Pages.
"Second Office Action Issued in Chinese Patent Application No. 201580051897.3", dated Oct. 14, 2019, 8 Pages.
"Second Office Action Issued in Chinese Patent Application No. 201580051951.4", dated Oct. 9, 2019, 22 Pages.
"Office Action Issued in Mexican Patent Application No. MX/a/2017/003839", dated Oct. 4, 2019, 4 Pages.
"Notice of Allowance Issued in Japanese Patent Application No. 2017-511244", dated Sep. 3, 2019, 5 Pages.
"Office Action Issued in Mexican Patent Application No. MX/a/2017/003838", dated Oct. 4, 2019, 4 Pages.
"Office Action Issued in European Patent Application No. 15775852.5", dated Oct. 23, 2019, 5 Pages.
"Second Office Action Issued in Chinese Patent Application No. 201580051980.0", dated Jan. 15, 2020, 41 Pages.
"First Office Action and Search Report Issued in Chinese Patent Application No. 201580051898.8", dated Dec. 16, 2019, 14 Pages.
"First Office Action and Search Report Issued in Chinese Patent Application No. 201580051899.2", dated Dec. 30, 2019, 26 Pages.
"Notice of Allowance Issued in Japanese Patent Application No. 2017-511247", dated Feb. 17, 2020, 5 Pages.
Good, Shiroi, "Close Up", Published by Nikkei computer, vol. 719, Dec. 15, 2008, 10 Pages.
"Office Action Issued in European Patent Application No. 15775848.3", dated May 11, 2020, 4 Pages.
"Office Action Issued in Australian Patent Application No. 2015321697", dated Apr. 18, 2020, 3 Pages.
"Office Action Issued in Australian Patent Application No. 2015321700", dated May 8, 2020, 5 Pages.
"Notice of Allowance Issued in Japanese Patent Application No. 2017-515807", dated Apr. 9, 2020, 5 Pages.
"Office Action Issued in Brazilian Patent Application No. BR112017004100-6", dated May 8, 2020, 5 Pages.
"Office Action Issued in Brazilian Patent Application No. BR112017004026-3", dated May 8, 2020, 5 Pages.
"Summons to Attend Oral Proceedings Issued in European Patent Application No. 15775849.1", dated Jun. 8, 2020, 8 Pages.
"Third Office Action Issued in Chinese Patent Application No. 201580051980.0", dated Jun. 15, 2020, 21 Pages.
"Office Action Issued in Australian Patent Application No. 2015321700", dated Jul. 2, 2020, 5 Pages.
Second Office Action Issued in Chinese Patent Application No. 201580051898.8', dated Jul. 10, 2020, 8 Pages.
"Office Action Issued in European Patent Application No. 15775852.5", dated Jul. 14, 2020, 4 Pages.
"Office Action Issued in Australian Patent Application No. 2015321812", dated Jul. 10, 2020, 7 Pages.
"SCSI", Retrieved from: https://en.wikipedia.org/wiki/SCSI#:~:text=Small%20Computer%20System%20Interface%20(SCSI,electrical%2c%20optical%20and%20logical%20interfaces, Retrieved Date: Jul. 10, 2020, 9 Pages.
"Second Office Action Issued in Chinese Patent Application No. 201580051899.2", dated Aug. 28, 2020, 30 Pages.

* cited by examiner

LENDING TARGET DEVICE RESOURCES TO HOST DEVICE COMPUTING ENVIRONMENT

CROSS-REFERENCE TO RELATED APPLICATIONS

This is a Divisional of U.S. patent application Ser. No. 14/495,355, filed Sep. 24, 2014, which is hereby incorporated by reference herein in its entirety.

BACKGROUND

Within the field of computing, many scenarios involve a user of a first device who wishes to interact also with a second device. As a first such example, a user may wish to initiate a terminal services session on a remote device. The user may connect a local device to the remote device over a network; may login to a user account on the remote device through the local device; and initiate the terminal services session on the remote device. Upon being presented with a terminal services session provided by the remote device to the local device, the user may interact with the second remote by providing input and receiving output through the local device. As a second such example, the user may request a mirroring of a display of a host device to a presentation device, such as a projector, and the same view of a host computing environment of the host device may be displayed both on a display of the host device and through the projector. As a third such example, a user may configure a first device to share user input (such as a keyboard and mouse) of the first device with a second device; e.g., the first device may receive the user input within a first computing environment of the first device, and may transmit some of the user input to the second device. In these and other ways, a user of various devices may enable the devices to interoperate in order to share device resources.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The available techniques for sharing resources among devices may exhibit some disadvantages. As a first such example, such techniques may depend upon an administrative configuration of each device by the user; e.g., a user may not typically initiate a terminal services session with a remote device that is not preconfigured to permit the user to do so, and keyboard and mouse sharing may involve the configuration by each device as an input sharing server and client. It may be more difficult for a user to couple the user's device with a second device on which the user does not have administrative privileges, and that has not been preconfigured to interoperate with the first device. As a second such example, these techniques may enable a resource of a first device to be shared with a second device, but may do so in an ad hoc manner, such that the shared resource is not represented as a resource of the second device in an equivalent manner as the other resources of the second device. As a third such example, these models may be based on a "pull" interaction model, whereby a first device initiates the interaction to utilize the resources from a second device. For example, in a terminal services session, a terminal services client initiates the request to receive a terminal session within a terminal services server, and the terminal services server then provides the computing environment to the user. However, such "pull" models often depend on the first device being able to discover the second device in order to initiate the request, and it may be difficult to achieve such discovery in some scenarios. As a fourth such example, various resource sharing models may not provide fine control over which resources are shared by a first device with a second device, and may therefore provided limited affordance for the preferences and security concerns of the user of the second device.

Presented herein are techniques that enable a target device resource of a target device, such as a display, keyboard, mouse, speakers, or network connection, to be integrated with a host computing environment of a host device. In accordance with these techniques, a target device may advertise an availability of a target device resource for use by other devices. A host computer having a host computing environment may detect an availability of the target device resource through the target device, and may receive a request from a host device user to utilize the target device resource within the host computing environment. The host device may therefore transmit a request to the target device to borrow the target device resource for use in the host computing environment. Upon receiving and accepting the request, the target device may reserve the target device resource for the host computing environment, and the host computing environment may integrate the target device resource with the host device resources of the host computing environment. In this manner, the host device may integrate the target device resource with the host computing environment on behalf of the host device user in accordance with the techniques presented herein.

The techniques presented herein may enable a user of a device to enable resource sharing in a comparatively casual manner; e.g., the user may simply borrow a selected target resource of the target device for the host device, such as temporarily having the mouse input from the target device redirected to the host computing environment. Such resource borrowing and lending may be achieved in a comparatively simple and casual manner; e.g., unlike terminal services, the user of the host device may not have to have a user account on the target device, or even be known to the target device, in order to negotiate such resource borrowing. In some embodiments, the host device user may have no permission to access the target computing environment of the target device, and the local user interface for the target device may even be completely locked and inaccessible to anyone except the target device user; and nevertheless, the target device may fulfill requests to "borrow" its keyboard, mouse, video, network connection, or other target device resources to the host device. Such borrowing and lending may be achieved without admitting the host device to the target computing environment of the target device; i.e., the target computing environment may be isolated, suspended, or otherwise safeguarded from unauthorized access by the host device through the resource borrowing and lending interaction.

The techniques presented herein may also enable the host device to utilize the target device as a portal into the host computing environment. For example, the target device may suspend much or all of its native computing environment, and may reallocate computing resources to the presentation of the host computing environment transmitted by the host device. In some scenarios, the borrowing of the resources of the target device by the host device, and the presentation of the host computing environment rendered by comparatively robust hardware of the host device, may enable the target device to present a higher-quality user experience than the target device is capable of achieving with its native computing environment. Target devices that have outlived an initial role may therefore be repurposed as portals into the host computing environment of the host device through the use of the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
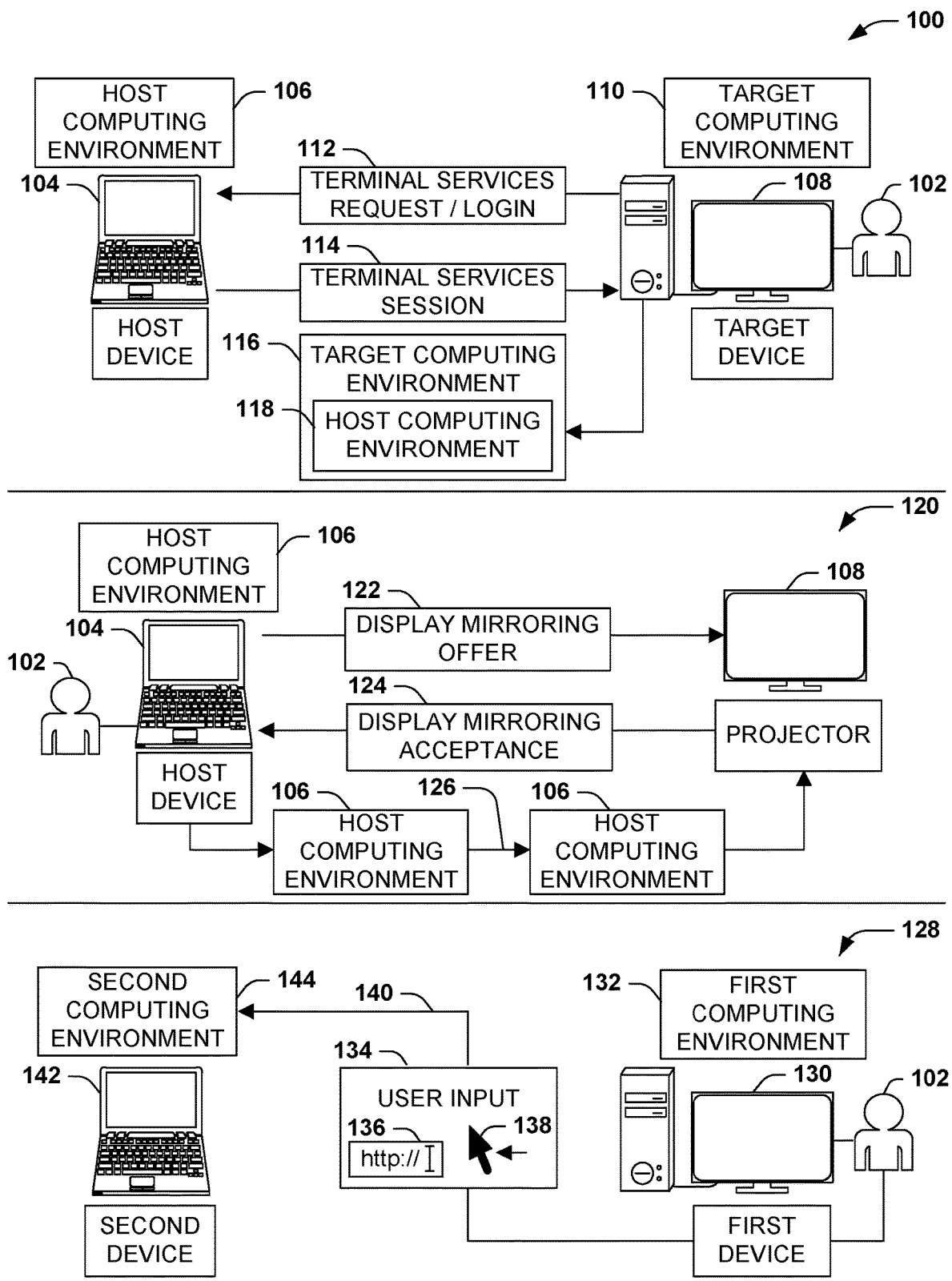
FIG. 1 is an illustration of an example scenario featuring example models of sharing resources of a first device with a second device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many techniques may be utilized to enable a first device to share resources with a second device, such as presenting video, sound, keyboard, mouse input, storage, network connections, and peripheral components such as printers. The various models may suit different interests of the users requesting such resource sharing, such as complexity, consent, security, configurability, and ease of use.

FIG. 1 presents an illustration of an exemplary scenario featuring three such models for enabling resource sharing between devices.

A first example scenario 100 of FIG. 1 presents an illustration of a terminal services sharing technique, wherein a user 102 who wishes to interact with a host computing environment 106 of a host device 104 may establish a terminal services session through a target device 108. For example, the user 102 may, through a target computing environment 110 of the target device 108, establish a connection and initiate a terminal services request 112 with the host device 104, e.g., by providing login credentials to an account of the user 102 on the host device 104. Upon verifying the login credentials of the user 102 with a local account of the user 102 within the host computing environment 106, the host device 104 may initiate the terminal services session 114, which causes a presentation on the target device 108 of a host computing environment view, within the target computing environment view 116 of the target device 108 (e.g., the desktop environment of the host computing environment 106 may appear within a window presented in the target computing environment 110). The user 102 may interact with the host computing environment view 118 as if the user 102 were physically accessing the host device 104, e.g., by using input devices of the target device 108 to direct input to the host device 104 for application to the host computing environment 106 and applications provided therein. A similar model is provided by a telnet and/or secure shell (SSH) session, wherein a user account of the user 102 within the host computing environment 106 may be presented within a console view on the target device 108.

A second example scenario 120 of FIG. 1 presents an illustration of a display mirroring model, such as a Wireless Display (Wi-Di) model, wherein a user 102 of a host device 104 requests to mirror a display of the host computing environment 106 on a display of a target device 108, such as a projector. The host device 104 may initiate an offer 122 to mirror the display to the target device 108, and upon receiving an acceptance 124 of the offer 122, the host device 104 may mirror 126 a display of the host computing environment 106 on the target device 108.

A third example scenario 128 of FIG. 1 presents an illustration of an input sharing model, wherein a user 102 of two devices may configure input and/or output to be shared among the devices. For example, the user 102 may configure a first device 134 to utilize some of user input 134 (e.g., text input 136 via a keyboard, and pointing input 138 via a mouse) within a first computing environment 132, but may also toggle the first device 130 to transmit 140 the user input 134 to a second device 142 for processing within a second computing environment 142. The user 102 may also configure the second device 142 to receive the user input 134 from the first device 130, and to apply the user input within a second computing environment 144 of the second device 142. By so configuring the first device 130 and the second device 142 and establishing a connection therebetween, the user 102 may achieve a sharing of user input 134 across the devices.

Each of the techniques presented in the example scenarios of FIG. 1 enables various models for resource sharing among devices. Some of these models may be more capable, easier to use, and/or satisfactory for some scenarios than other models. However, each model may exhibit some disadvantages that diminish the applicability and suitability of such model for particular scenarios.

As a first example, many models for resource sharing depend on a preconfiguration of the devices by the user 102 to enable such resource sharing. For example, host devices 104 do not typically allow any user 102 to establish a terminal services session 114 with the host device 104, but only permit users 102 who have a user account within the host computing environment 106 to initiate such sessions, because allowing any user 102 to initiate a terminal services session 114 may represent a security vulnerability. Similarly, the configuration of input sharing 128 typically involves configuration by the user 102 to permit the first device 130 to transmit user input 134, and the second device 142 to receive and accept the user input 134, because allowing unknown users 102 to transmit and/or receive input into the computing environment of each device 130 may represent a security risk. Conversely, a device may provide resources upon request by anyone, such as in the projector scenario, but a user of the resource-sharing device may not be wiling to allow unknown and/or unauthorized individuals to access the resources of the device arbitrarily, as this may entail an unacceptable security risk and/or depletion of the resources of the resource-sharing device.

As a second example, many models for sharing resources are constrained to sharing a particular type of resource. As a first such example, terminal services models enable sharing a terminal services session 114 that typically extends to the target device 108 the complete set of resources that are available to the user 102 of the host device 104. However, the user 102 may only wish to utilize a selected host device resource of the host computing environment 106 of the host device 104, but may be unable to limit the terminal services session 114 to the particular host device resource. Similarly, Wireless Display enables the mirroring of a display, and input sharing enables the sharing of user input 134, but it may be difficult to extend such sharing models to involve other types of resources, such as sound, peripherals such as network connections, scanning and fax equipment, and communication sessions. Rather, each model may be provided for a specific type of resource sharing, but may be limited only to such sharing.

As a third example, the sharing of a resource of a first device with a second device is often not well-integrated with the computing environment of the second device, but may simply be received and applied in an ad hoc manner. For example, in the terminal services model, the resources of the host device 104 are encapsulated within the host computing environment view 118 of the host computing environment 106, and are treated by the target device 108 in a different manner than the target resources of the target device 108. Similarly, in the wireless display model, the user 102 may view a mirror of the display on the projector, but may not be able to utilize any resources of the projector to interact with the host computing environment 106; e.g., the projector may be limited to mirroring the host computing environment 106 transmitted by the host device 104 in a non-interactive manner, even if the projector is a target device 108 including one or more input devices. As a third such example, the sharing of user input 134 by the first device 130 may be implemented as a stream of user input commands transmitted to the second device 142, but the second device 142 may not represent the user input devices of the first device 130 as distinct resources (e.g., user input devices) within the second computing environment 114. For example, the second device 142 may not be capable of interacting with the user input devices of the first device 130 (e.g., querying such devices for input device properties, such as the activation of caps lock or number lock on the keyboard, and/or configuring the mouse of the first device 130 to adjust features such as pointer acceleration). Rather, an input sharing server of the second device 142 may simply apply the user input 134 received from the first device 130 in an ad hoc manner, and may not even be informed of the types of user input devices provided on the first device 130 (e.g., whether pointing input is being received through a mouse, stylus, trackball, touch-sensitive, gestural, or gaze-tracking device). Indeed, it may even be difficult for a user 102 of the second device 142 to determine the source of the user input 134; e.g., none of the input devices registered with the second device 104 may exhibit the user input 134 that is being received and processed by the second device 142. These and other disadvantages may arise within the context of many resource sharing models, including those illustrated in the example scenarios of FIG. 1, that diminish the applicability and ease of use of such techniques for various scenarios and interests.

B. Presented Techniques

Presented herein are techniques for enabling resource borrowing and lending among devices in a manner that may integrate particular resources of a target device 108 with a host computing environment 106 of a host device 104. In accordance with such techniques, a target device 108 may advertise an availability of a target device resource of the target device for integration with a host computing environment 106 of a host device 104. The host device 104 may detect such availability, and, responsive to receiving a request from a host device user 102 to integrate the target device resource with the host computing environment 106, may transmit to the target device 108 a request to borrow the target device resource for use in the host computing environment 106. The target device 108 may accept the offer, and reserve the target device resource for the host computing environment 106 (e.g., binding an input component exclusively or non-exclusively to the host computing environment 106, and/or reserving part or all of a presentation device for rendering at least a portion of the host computing environment 106 of the host device 104). Responsive to receiving the acceptance of the request from the target device 108, the host device 104 may integrate the target device resource with the host computing environment 106 alongside the host device resources (e.g., representing a user input device of the target device 108 as a first-class input device, on par with other user input devices that are physically and/or wirelessly directly connected to the host device 104), and may present the target device resource to the host device user 102 within the host computing environment 106. The user 102 may then utilize the resources of the target device 108 while interacting with the host device 104, e.g., "borrowing" a mouse that is physically connected to the target device 108 in order to provide input within the host computing environment 106 of the host device 104.

Figure 2:
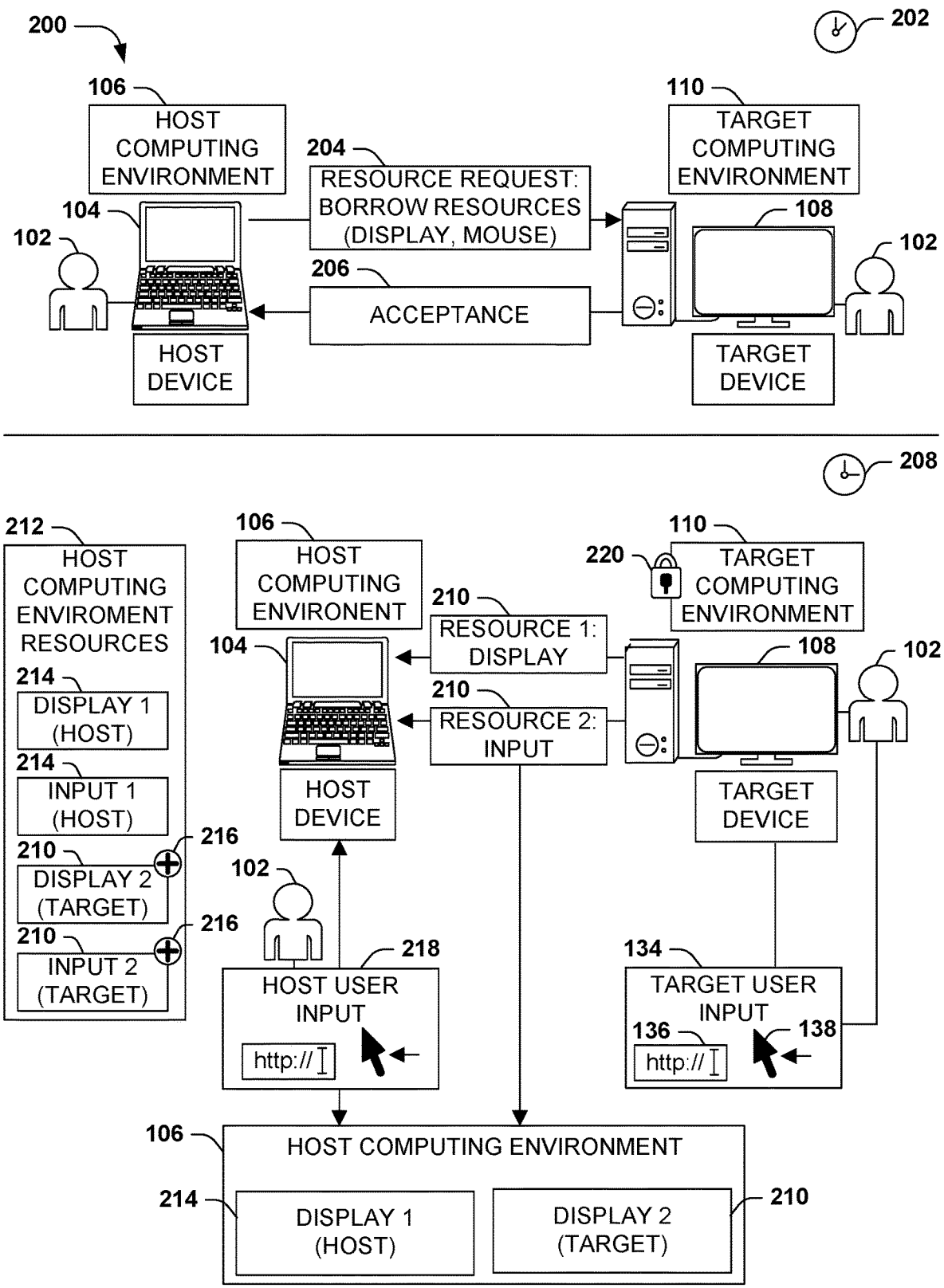
FIG. 2 is an illustration of an example scenario featuring an integration of a target device resource with a host computing environment of a host device, in accordance with the techniques presented herein.

FIG. 2 presents an illustration of an example scenario 200 featuring a borrowing of target device resources 210 of a target device 108 to a host device 104 in accordance with the techniques presented herein. In this example scenario 200, at a first time 202, a user 102 of the host device 104 may initiate a request to borrow specific target device resources 210 of the target device 108 for use by the host device 104, such as the display and mouse of the target device 108. The host device 104 may transmit a resource request 204 to the target device 108, which may be presented to a user 102 of the target device 108 (although, in other scenarios, the resource request 204 may be evaluated autonomously by the target device 108). The user 102 of the target device 108 may receive and consider the resource request 204, and may authorize the borrowing of the target device resources 210 for use in the host device 104. Accordingly, the target device 108 may transmit an acceptance 206 of the resource request 204 to the host device 104.

At a second time 208, the host device 104 and the target device 108 may fulfill the borrowing of the target device resources 210 for use in the host device 104. The target device 108 may reserve the target device resources 210 for use by the host device 104 (e.g., initiating a borrowing of a target device resource 210 between the target computing environment 110 and the host device 104, and/or withdrawing a target device resource 210 from the target computing environment 110 while lent to the host device 104). The host device 104 may also integrate the target device resources 210 in the host computing environment resource set 212, e.g., adding 216 the target device resources 210 as first-class devices within the host computing environment 106, alongside the host device resources 214 that are directly attached to the host device 104. For example, when the target device 108 receives target user input 134 through a target device resource 210 that has been lent to the host device 104, the target device 108 may transmit the target user input 134 to the host device 104, which may apply the target user input 134 to the host computing environment 106 alongside host user input 218 received through a host device input resource, such as a keyboard directly connected to the host device 104. The host computing environment 106 may also presented on both a host device display of the host device 104 and a target device display of the target device 108 that has been lent to the host device 104. Additionally, the target computing environment 220 may be secured from the host computing environment 106, e.g., by locking 220 and/or suspending the target computing environment 110 while the target device resources 210 are lent to and integrated with the host computing environment 106. In this manner, the host device 104 and target device 108 may interoperate to achieve the borrowing of the target device resources 210 for use in the host device 104 in accordance with the techniques presented herein.

C. Technical Effects

The use of the techniques presented herein to borrow target device resources 210 of the target device 108 for use in the host device 104 may exhibit a variety of technical effects for the host device 104 and/or the target device 108.

As a first example of a technical effect that may be achievable by the techniques presented herein, the host device 104 and target device 108 may share target device resources 210 in an easier and more casual manner than other sharing techniques, such as terminal services. A terminal services session (such as illustrated in the first example scenario 100 of FIG. 1) depends upon several criteria: first, the user 102 has a user account on the host device 104 for which terminal services has been enabled; second, the user 102 is able to access the target computing environment 110 of the target device 108 to initiate the terminal services request 112; third, the target device 108 has to be able to discover and initiate contact with the host device 104; and fourth, the user 102 has to authenticate himself for herself with the host device 104, such as by providing login credentials. The failure of any such criteria may prohibit the initiation of the terminal services session 114; e.g., if the user 102 does not remember the address of the host device 104, or if the target device 108 is unable to contact the host device 104 such as due to a firewall, the terminal services session 114 is unachievable. By contrast, in the techniques illustrated in the example scenario 200 of FIG. 2, the user 102 of the host device 104 does not have to have a user account with the target device 108, and does not have to access the target device 108, which may fulfill the resource request 204 through an autonomous acceptance 206 of the borrowing request and/or acceptance by the user 102 of the target device 108. Such borrowing and lending of target device resources 204 may therefore be achieved in a comparatively easier and more casual manner.

As a second example of a technical effect that may be achievable by the techniques presented herein, the casual borrowing and lending of target device resources 210 may enable resource sharing scenarios that are not achievable through other models. As a first such example, a target device 108 may permit the borrowing of target device resources 204 by a user 102 and/or host device 104 that are not otherwise permitted to utilize the target device 108. For example, the target device 108 may prohibit the user 102 from logging into the target device 108 or interacting with the target computing environment 110, and may actively isolate the target computing environment 110 from the user 102 (e.g., by locking the target device 108 to anyone but the user 102 of the target device 108), but may nevertheless permit the borrowing of a mouse or display to the host device 104 for integration with the host computing environment 106. As a second such example, the integration of the target device resources 210 alongside the host device resources 214 of the host device 104 may enable a user 102 of the host device 104 and a user 102 of the target device 108 to interact with the host computing environment 106 together. For example, the host device user 102 may provide host user input 218 through the input devices and display that are directly connected to the host device 104 and the target device user 102 may provide target user input 134 through the input devices and display of the target device 108 that have been lent to the host computing environment 106, and the host computing environment 106 may concurrently reflect both sources of input and both displays. Such concurrent utilization may not be achievable through other resource sharing models; e.g., when a user 102 initiates a terminal services session 114 from a target device 108, the host device 104 often locks out local access to the host device 104 and/or the same user account for the duration of the terminal services session 114.

As a third example of a technical effect that may be achievable by the techniques presented herein, the sharing of target device 210 as provided herein may enable a finer level of detail in the borrowing and lending than are achievable through other resource sharing models. For example, when the user 102 of the host device 104 initiates a terminal services session 114, the entire host computing environment 106 may be exposed to the target device 108. However, this may not be the intent of the user 102; rather, the user 102 may only wish to utilize the mouse of the target device 108 with the host device 104 without also displaying the contents of the host computing environment 106 on the target device 108, or may only wish to display some content of the host device 104 on the target device 108 without enabling user input to be directed by the target device 108 to the host device 104. Similarly, the user 102 of the target device 108 may wish to lend only a specific target device resource to the host device 104, such as only the mouse, but may be unable to achieve such selective resource sharing in the context of a terminal services session 114. The example scenario 200 of FIG. 2 illustrates the achievable selectivity of target device resource lending and borrowing in accordance with the techniques presented herein.

As a fourth example of a technical effect that may be achievable through the use of the techniques presented herein, the integration of the target device resources 210 with the host computing environment 106 may present a more robust representation of such target device resources 210 than ad hoc resource sharing models. For example, in the third example scenario 128 of FIG. 1, the user input sharing architecture may enable the first device 130 to push user input 134 to the second device 142; e.g., the first device 130 may simply present abstract user input instructions to the second device 142, such as text entry and pointer movement, without even indicating the type of input device through which such user input 134 was received through the first device 103. However, the second device 142 may not have any capability to interact with the input components of the first device 130 (e.g., in order to adjust the mouse acceleration or button-click effects of a mouse device, or the touch-sensitivity or recognized gestures of a touch-sensitive display or touchpad). The input devices of the first device 130 do not appear in the second computing environment 144, and it may be difficult for applications on the second device 142 even to determine the source of the user input, which may not have originated through any of the input devices represented in the second computing environment 114. By contrast, the techniques presented herein enable a more consistent and robust resource sharing model by integrating the borrowed target device resources 210 with the host computing environment 106.

As a fifth example of a technical effect that may be achievable by the techniques presented herein, the borrowing and lending of target device resources 210 may enable the host device 104 to drive a robust computing environment experience through the target device 108. For example, if the host device 104 borrows the keyboard and mouse input of the target device 108, as well as the video and sound output of the target device 108, the host device 104 may present a complete experience of the host computing environment 106 upon the target device 108. The target device 108 may also present the host computing environment 106 while suspending the target computing environment 110 of the target device 108, which may enable the target device 108 to allocate computational resources to the presentation of host computing environment 106 that might otherwise be divided therebetween (e.g., in contrast with a terminal services model, in which the processor, memory, input, network connection, and other resources of the target device 108 are often divided between the terminal services session 114 and the target computing environment 110). The target device 108 may therefore present a comparatively high-quality experience from the host device 104 by allocating a majority of computational resources to the presentation of the host computing environment 106. In some scenarios, a target device 108 featuring comparatively limited and/or outdated computational hardware, such as a commodity tablet lacking a graphics coprocessor, may present a host computing environment 106 rendered by a host computer 104 featuring comparatively sophisticated hardware. In this case, the presentation of the host computing environment 106 may exceed the robustness, graphics quality, and/or responsiveness of the native target computing environment 110 of the target device 108. The techniques presented herein may therefore facilitate device repurposing for comparatively outdated hardware (e.g., a user 102 of the target device 108 may not have a sufficient use for the native target computing environment 110 of the target device 108, but may achieve repurposed functionality by using the target device 108 as a portal into the host computing environment 106).

As a sixth example of a technical effect that may be achievable through the use of the techniques presented herein, the borrowing of target device resources 210 may permit the host device 104 to present resources and content to the target device 108 that the target device 108 is not natively capable of using. As a first such example, the user 102 may wish to present an application on the target device 108 that is not compatible with the target computing environment 110 (e.g., the application may be compiled for an instruction set and/or architecture than the target computing environment 110 supports). Instead, the user 102 may execute the application on the host device 104 and present the host computing environment 106 using the target device resources 210 of the target device 108. As a second such example, the host device 104 may have an application or content that the host device 104 is licensed to use, but that the target device 108 is not. Rather than transmitting such resources to the target device 108 that are not usable there, the host device 104 may locally execute the application or render the content, and may borrow target device resources 210 of the target device 108 to present part or all of the application or content through the target device 108. These and other technical effects may be achievable through various implementations of the techniques presented herein.

D. Example Embodiments

Figure 3:
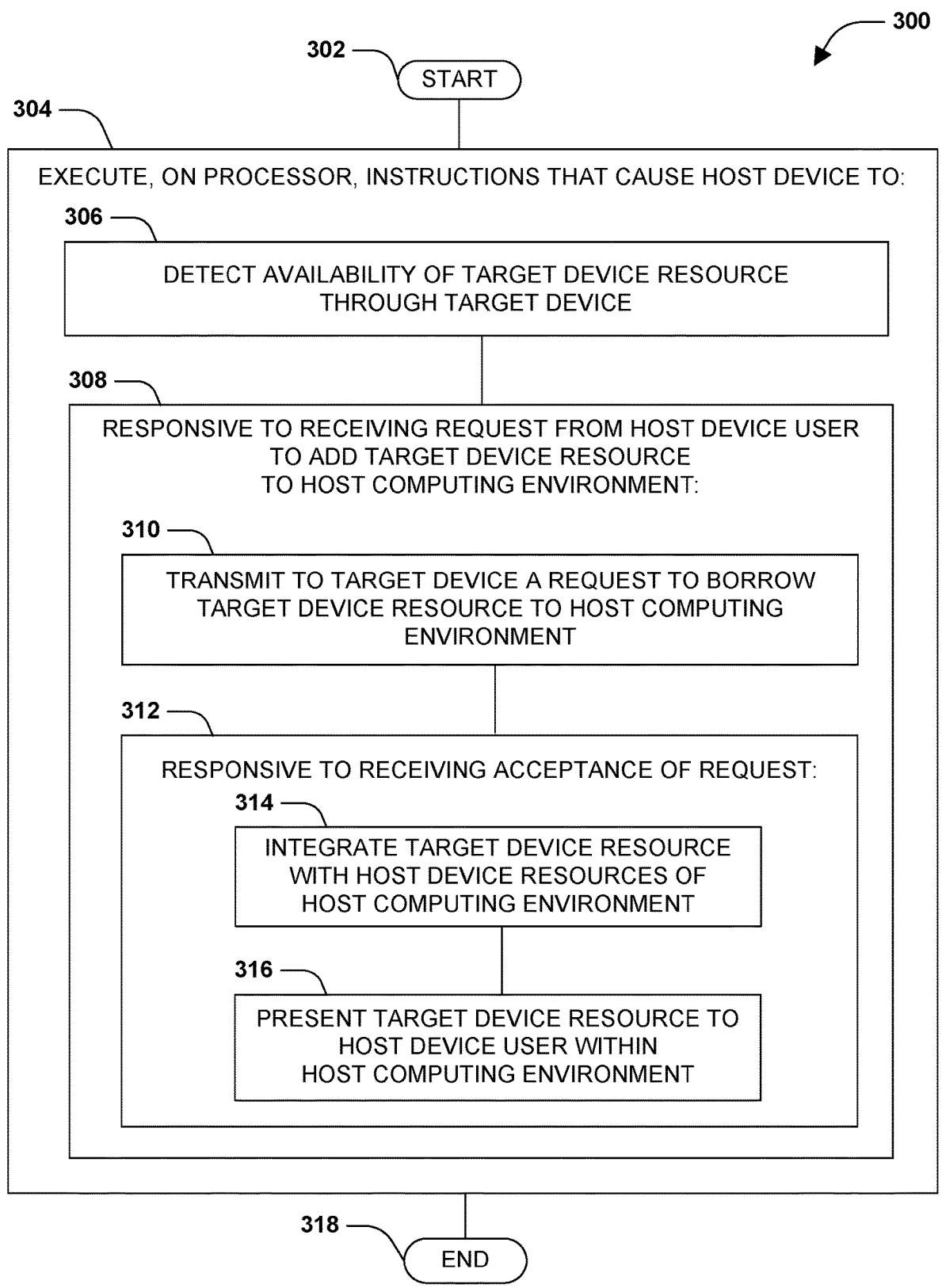
FIG. 3 is a flow diagram of an example method of enabling a host device to integrate a target device resource of a target device with a host computing environment, in accordance with the techniques presented herein.

FIG. 3 presents a first example embodiment of the techniques presented herein, illustrated as an example method 300 of configuring a host device 104 to integrate a target device resource 210 of a target device 108 with a host computing environment 106 of the host device 104. The example method 300 may be implemented, e.g., as a set of instructions stored in a memory component of the host device 104, such as a memory circuit, a platter of a hard disk drive, a solid-state storage device, or a magnetic or optical disc, and organized such that, when executed on a processor of the device, cause the host device 104 to operate according to the techniques presented herein.

The example method 300 begins at 302 and involves executing 304 the instructions on a processor of the host device 104. Specifically, executing 304 the instructions on the processor causes the host device 104 to detect 306 an availability of the target device resource 210 through the target device 108. Executing 304 the instructions on the processor causes the host device 104 to, responsive 308 to receiving a request from a host device user 102 to borrow the target device resource 210 for use in the host computing environment 106, transmit 310 to the target device 108 a request 204 to borrow the target device resource 210 for use in the host computing environment 106. Executing 304 the instructions on the processor causes the host device 104 to, responsive 312 to receiving from the target device 108 an acceptance 206 of the request 204, integrate 314 the target device resource 210 with the host device resources 214 of the host computing environment 106, and present 316 the target device resource 210 to the host device user 102 within the host computing environment 106. In this manner, the instructions cause the host device 104 to integrate the target device resources 210 of the target device 104 with the host computing environment 106 in accordance with the techniques presented herein, and so the example method ends at 318.

A second example embodiment of the techniques presented herein (not illustrated) involves an example method of configuring a target device 108 to lend target device resources 210 from a target computing environment 110 for use in a host computing environment 106 of a host device 104. Such an example method may involve, e.g., executing, on a processor of the target device 108, instructions that cause the target device 108 to advertise an availability of the target device resource 210; and responsive to receiving a request 204 to borrow the target device resource for use in the host computing environment, reserving the target device resource 210 for the host computing environment 106, and transmitting 206 an acceptance of the request 204 to the host device 104. In this manner, the instructions cause the target device 108 to lend the target device resources 210 from the target computing environment 110 for use in the host computing environment 106 in accordance with the techniques presented herein, and so the example method ends.

Figure 4:
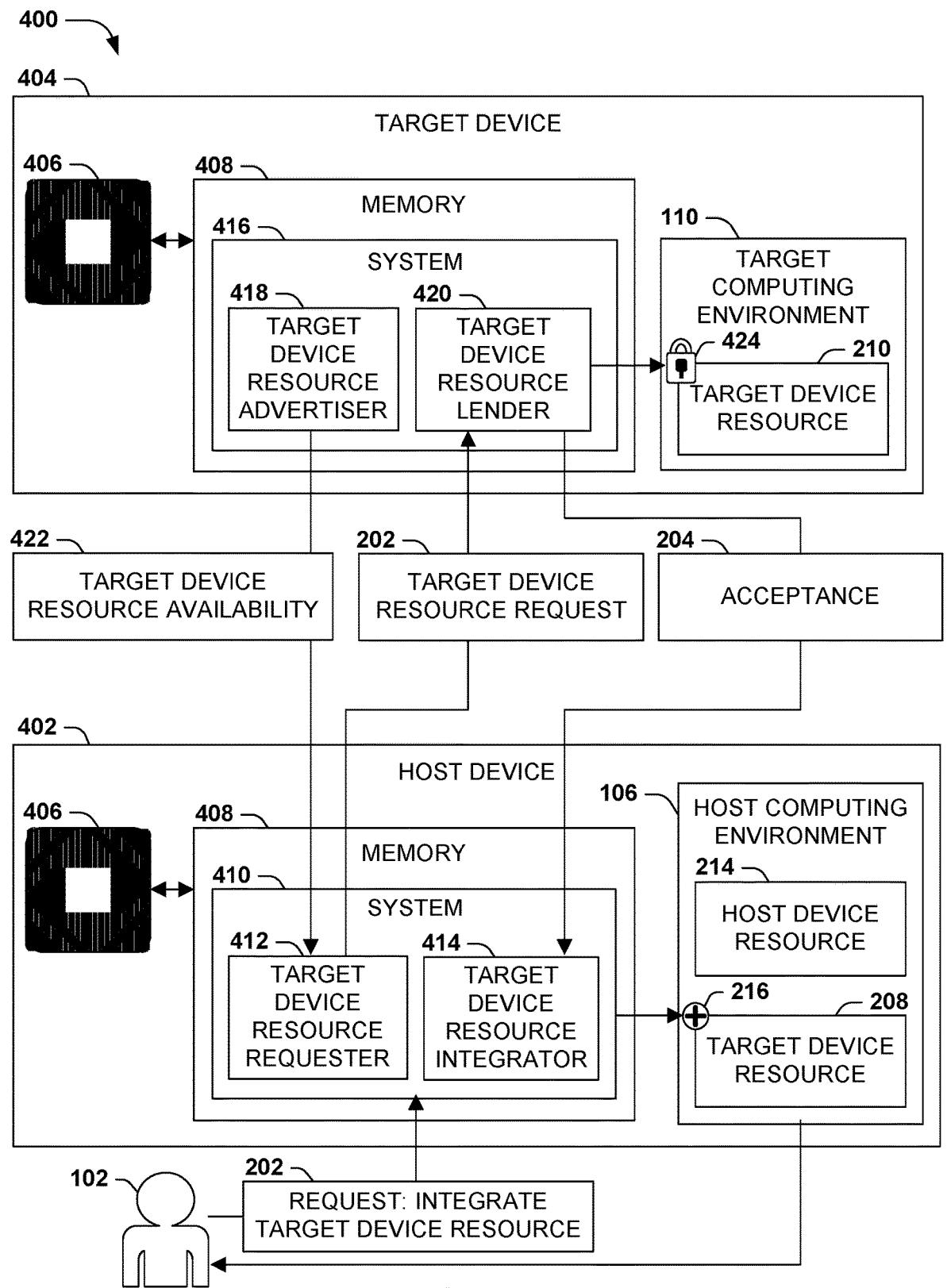
FIG. 4 is a component block diagram of example systems that enable a host device and a target device to integrate of a target device resource of the target device with a host computing environment of the host device, in accordance with the techniques presented herein.

FIG. 4 presents further example embodiments of the techniques presented herein, illustrated as example systems respectively implemented on an example host device 402 and an example target device 404 that respectively implement at least a portion of the techniques presented herein. The example host device 402 hosts and/or manages a host computing environment 106 featuring one or more host device resources 214, such as representations of devices that are directly connected to the example host device 402 (e.g., user interface, applications, visual features such as fonts and color schemes, data, application configurations, contact lists, and user accounts and credentials), and the example target device 404 hosts a target computing environment 110 featuring a target device resource 210. In this exemplary scenario 400, each of the example host device 402 and the example target device 404 includes a processor 406 and a memory 408 that stores processor-executable instructions that implement, on each device, an example system that implements at least a portion of the techniques presented herein. The respective example systems may be implemented, e.g., as a set of components respectively comprising a set of instructions stored in the memory 408 of the respective example devices, where the instructions of respective components, when executed on the processor 406, cause the example device to operate in accordance with the techniques presented herein. Alternatively, the respective components may be implemented as a discrete circuit or hardware device, or a combination thereof, that operate in accordance with the techniques presented herein.

The example host device 402 includes a first example system 410 comprising a target device resource request 412, which detects an availability 422 of the target device resource 210 through the example target device 404, and, responsive to receiving a request 202 from a host device user 102 to integrate the target device resource 210 with the host computing environment 106, transmit to the example target device 404 a request 202 to borrow the target device resource 210 for use in the host computing environment 106. The first example system 410 also includes a target device resource integrator 414, which, responsive to receiving from the example target device 404 an acceptance 204 of the request 202, integrates the target device resource 210 with the host device resources 214 of the host computing environment 106, and present the target device resource 210 to the host device user 102 within the host computing environment 106.

The example target device 404 includes a second example system 416 that a target device resource advertiser 418, which transmits (e.g., by broadcast, multicast, or in response to a query) an advertisement of an availability 422 of the target device resource 210. The example target device 404 also includes a device resource lender 420, which, responsive to receiving a request 202 to borrow the target device resource 210 for use in the host computing environment 106, reserves 424 the target device resource 210 for the host computing environment 106, and transmits an acceptance 204 of the request 202 to the host device 402. The interoperation of the example host device 402 and the example target device 404 utilizing such example systems may enable a cooperative integration of the target device resource 210 of the example target device 40 within the host computing environment 106 of the example host device 402 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
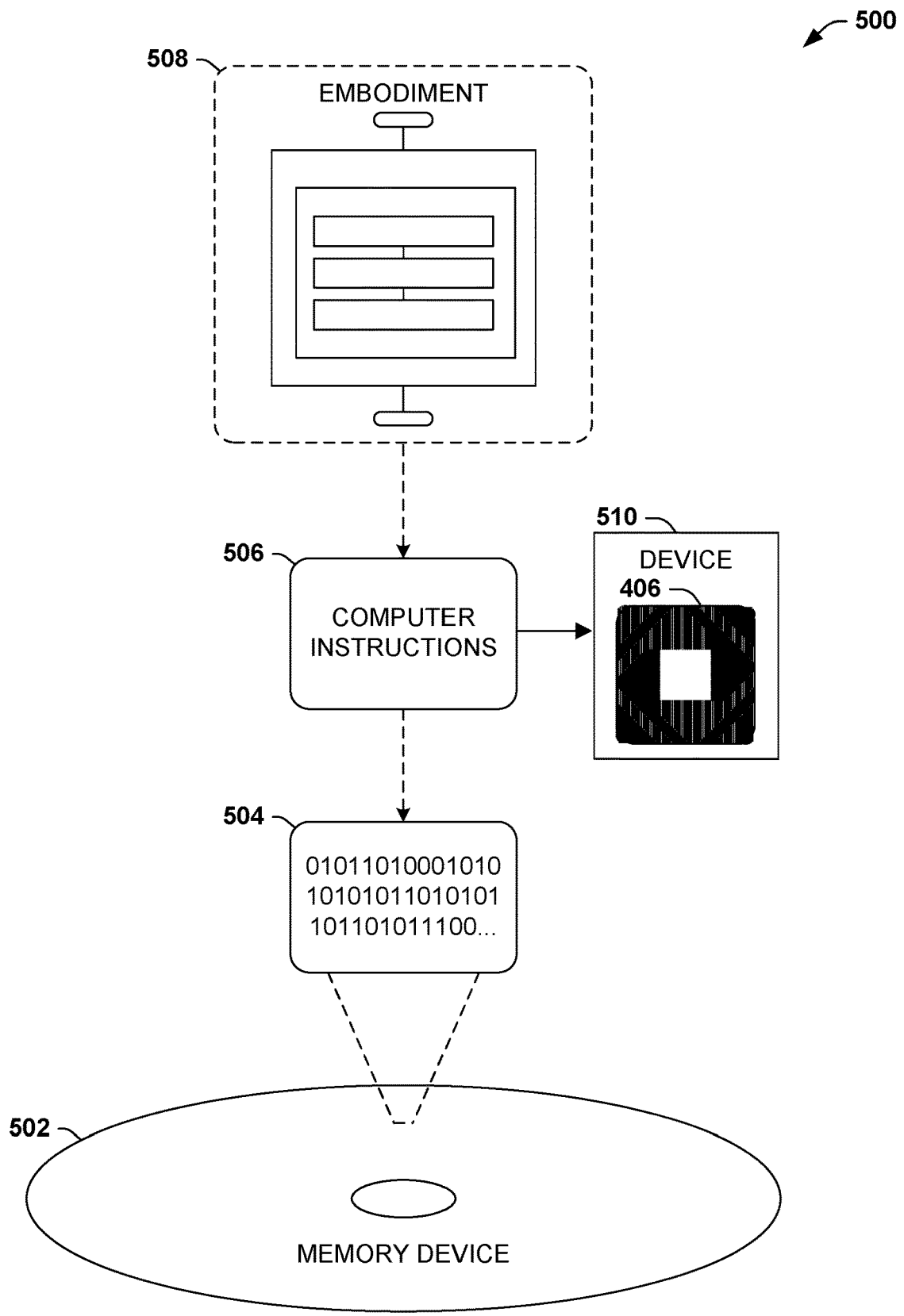
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 406 of a device 510, cause the device 510 to operate according to the principles set forth herein. In a first such embodiment, the processor-executable instructions 506 may cause a host device 202 to integrate a target device resource 210 of a target device 108 with a host computing environment 106 of the host device 104, such as the example method 300 of FIG. 3. In a second such embodiment, the processor-executable instructions 506 may cause a host device 104 and/or a target device 108 to implement systems that enable the integration of the target device resources 210 with the host computing environment 106 of a host device 104, such as the example systems presented in the example scenario 400 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example systems of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of hos devices 104 and/or target devices 108, such as workstations, laptops, tablets, mobile phones, game consoles, portable gaming devices, portable or non-portable media players, media display devices such as televisions, appliances, home automation devices, computing components integrated with a wearable device such as an eyepiece or a watch, and supervisory control and data acquisition (SCADA) devices.

As a second variation of this first aspect, the target device resources 210 and the host device resources 214 may comprise a variety of resource types, including output devices (e.g., displays, speakers, and haptic output devices, such as vibration mechanisms); input devices (e.g., keyboards, mice, styli, touch-sensitive displays and touchpads, gesture- and gaze-tracking devices, and biometric input devices); peripherals (e.g., printers, scanners, cameras, and robotic components); communication resources (e.g., network connections, interfaces, and devices); and basic computing resources (e.g., processing capacity and storage capacity).

As a third variation of this first aspect, the techniques presented herein may be utilized with a variety of architectures and/or relationships of the host device 104 and the target device 108. As a first such example, the respective devices may utilize components that are directly and physically connected to the device, such as wired displays, speakers, and headphones. As a second such example, the respective devices may utilize one more components that are accessible via a wireless connection, such as a radiofrequency. As a third such example, the respective devices may communicate over a personal-area, local-area, and/or wide-area network in order to interoperate according to the techniques presented herein. As a fourth such example, the respective device may utilize one or more components that are accessible through a third device of a device collection, such as in a client/server or peer-to-peer architecture. Moreover, each of the host device 104 and the target device 108 may be utilized by one user 102 or a group of users 102, and/or may be controlled by at least one first user 102 on behalf of at least one second user 102. These and other scenarios may be suitable for the integration of the target device resources 210 of the target device 108 with the host computing environment 106 of the host device 104, in accordance with the techniques presented herein.

E2. Establishing Target Device Resource Lending

A second aspect that may vary among embodiments of the techniques presented herein involves the manner of establishing the lending of the target device resource 210 from the target device 108 to the host device 104.

As a first variation of this second aspect, the host device 104 may discover the availability 422 of the target device resource 210 in a variety of ways. As a first such example, the target device 108 may advertise the availability 422 of the target device resource 210, e.g., by broadcasting the available resource over a short-range network, a local area network, or a wide-area network, or by listing the target device resource 210 in an availability catalog of available target device resources available through various target deices 108. The host device 104 may then receive the advertisement of such availability 422 of the target device resource 210 (e.g., by receiving such a broadcast or finding the target device resource 210 in the availability catalog). As a second such example, the host device 104 may broadcast a query for available target device resources 210, which, optionally, may specify a particular type of target device resource 210 that the host device 104 wishes to present within the host computing environment 106. The target device 210 may respond by notifying the host device 104 of the availability 422 of at least one target device resource 210 through the target device 108. As a third such example, the host device 104 and target device 108 may initiate a specific connection that provides a basis for advertising the availability 422 of the target device resources 210 for the host device 104. For example, a detection of a physical proximity of the host device 104 and the target device 108 within a physical proximity threshold (e.g., the user 102 may set down a mobile host device 104 on top of or within one meter of a target device 108 from which the user 102 wishes to borrow target device resources 210) may trigger the advertisement of the availability 422 of the target device resources 210 to the host device 104.

As a second variation of this second aspect, the host device 104 and target device 108 may negotiate the availability 422 of the target device resource 210 for the host device 104. As a first such example, the host device 104 and the target device 108 may engage in scheduling (e.g., identifying a block of time for the reservation of the target device resource 210 for the host device 104). As a second such example, the host device 104 and the target device 108 may utilize load balancing (e.g., among a set of available target devices 108 and target device resources 210, identifying a selected target device 108 and target device resource 210 that are idle and/or well-adapted to the circumstances of the host device 104). As a third such example, the host device 104 and the target device 108 may engage in bargaining (e.g., negotiating and agreeing upon a cost for the reservation of the target device resource 210 for the host device 104). As a fourth such example, the target device 108 may engage in resource lending only with specific host device 104. As one such example, the availability 422 of the target device resource 210 to host devices 104 may be constrained by an access credential (e.g., a password or certificate). The host device 104 may submit the access credential with the request, and the target device 108 may reserve the target device resource 210 for the host device 104 only upon verifying the access credential. Alternatively or additionally, if the target device 108 and the host device 104 have a trust relationship, the target device 108 may automatically grant or even initiate the lending of target device resources 210 upon connecting to and authenticating the host device 104.

As a third variation of this second aspect, the host device 104 and/or the target device 108 may autonomously engage in the borrowing and lending of the target device resources 210 (e.g., the target device 108 may autonomously agree to lending target device resources 210, even if the target device 108 is idle, locked, suspended, powered down, or otherwise not in use by a user 102). Alternatively, the host device 104 and/or the target device 108 may condition such interaction on the authorization of a user 102. As a first such example, upon detecting the availability 422 of a target device resource 210 through a target device 108, a host device 104 may notify a host device user 102 of the availability 422 of the target device resource 210 for integration with the host computing environment 106, and may await a request 202 from the user 102 before initiating the resource lending. As a second such example, a target device 108 that is operated by a target device user 102 may, responsive to receiving the request 202 to borrow the target device resource 210 for use by the host device 104, present the request 202 to the target device user 102, and transmit the acceptance 204 only upon receiving an acceptance of the request 202 from the target device user 102.

As a fourth variation of this second aspect, the borrowing and lending of target device resources 210 may be limited to particular target device resources 210 of a target device resource set 210. As a first such example, the target device 108 may advertise the availability 422 only of selected target device resources 210 (e.g., advertising the availability 422 of a display only when not in use by a target device user 102), and may consider the other target device resources 210 to be unavailable. As a second such example, the target device 108 advertises an availability 422 of at least two target device resources 210, but the host device 104 may only request a borrowing of a selected target device resource (e.g., requesting only to borrow the mouse, and not the keyboard). Accordingly, the request 202 from the host device user 102 may specify the selected target device resource 104 to be integrated with the host computing environment 106, and the host device 104 may transmit to the target device 108 a request 202 to borrow only the selected target device resource 210 for use in the host computing environment 106. The target device 108 may notify a target device user 102 of the selected target device resources 210 that the host device 104 has requested in order to facilitate the user's choice.

As a fifth variation of this second aspect, the request 202 of the host device 104 to borrow a target device resource 210 may also inform the target device 108 of the intended use of the target device resource 210. For example, the target device resource 210 further comprises a target presentation component (e.g., a display or speakers), and the request 202 from the host device user 102 may specify a particular content item to be presented through the target presentation component of the target 108 (e.g., a particular image, video, sound recording, document, or web page that the user 102 wishes to present through the target device 108). The request 202 may therefore include a description of the content item (e.g., a text description, summary, or preview, such as a thumbnail version of the image) to be presented through the presentation component of the target device 108, which the target device 108 may present to a target device user 102 to assist with the user's choice. As a further variation, the target device 108 may engage in the lending of the target device resource 108 only for the duration of the presentation of the specified content item, and may then automatically terminate the lending and release the reservation of the target device resource 210 for the host device 104 (e.g., terminating the lending of a display upon completion of a video for which the lending was authorized).

Figure 6:
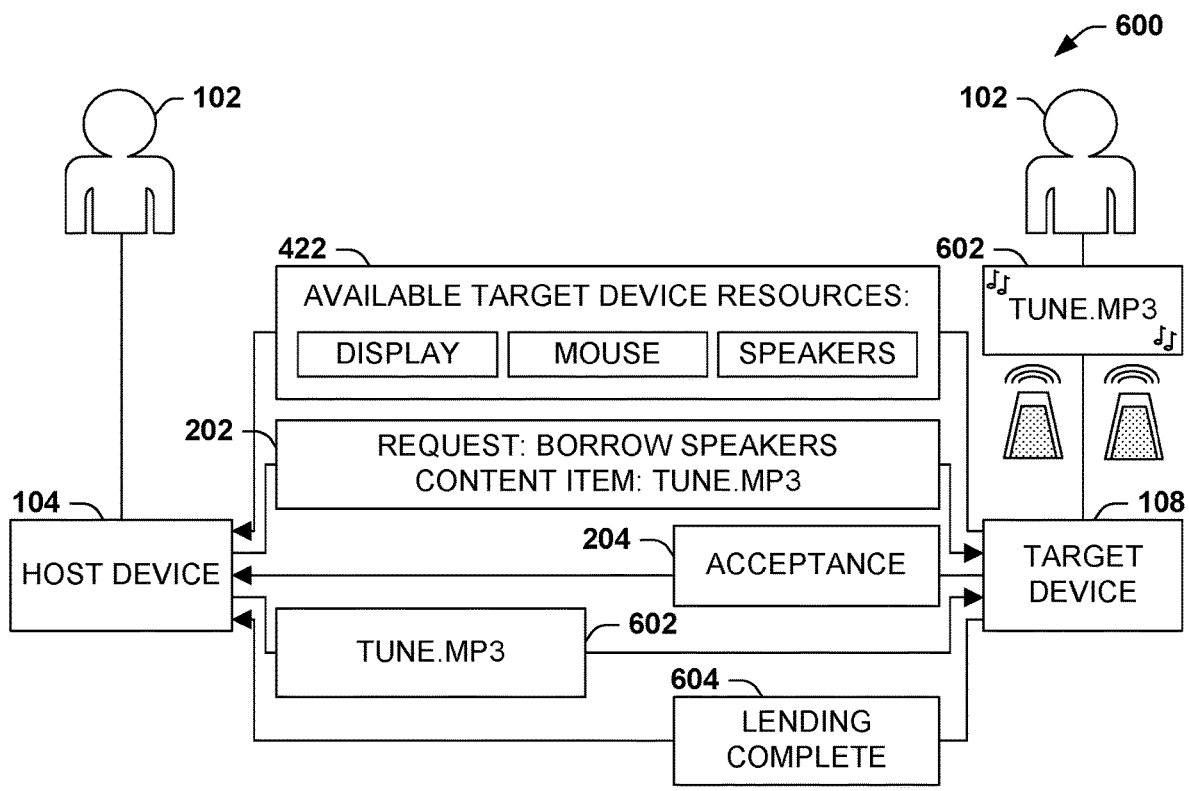
FIG. 6 is an illustration of an example scenario featuring an interaction of a host device and a target device to share a target device resource on behalf of a host device user and a target device user, in accordance with the techniques presented herein.

FIG. 6 presents an illustration of an example scenario 600 featuring an interaction of a host device 104 and a target device 108 to lend a target device resource 210 of the target device 108 to the host device 104. In this example scenario 600, a host device user 102 of the host device 104 wishes to play a content item 602 (specifically, a song recording), but may not have suitable equipment on the host device 104 (e.g., a mobile phone may feature only a low-powered and low-quality speaker). The target device 108 may advertise the availability 422 of various target device resource 210, such as a display, a mouse, and speakers. The host device 104 may notify the host device user 102 of such availability 422, and the user 102 may initiate a request to present the content item 602 on the speakers of the target device 108. The host device 104 may send to the target device 108 a request 202 to borrow the target device resource 210 for use by the host device 104, and particularly for the task of rendering the content item 602. The target device 108 may present the request 202 to a target device user 102, who may reply with an acceptance 204 of the request 202. Accordingly, the target device 108 may reserve the target device resource 210 for the host device 104 (e.g., fading out of halting any sound playing through the speakers from the target computing environment 110), and may transmit the acceptance 204 to the host device 104. The host device 104 may integrate the speakers with the host computing environment 106, and may initiate rendering of the content item 602 within the host computing environment 106 (e.g., initiating a rendering stream that is generally controlled and available within the host computing environment 106, but where the audio stream is also transmitted to the target device 108 for presentation through the speakers). The target device 108 may accordingly render the content item 602 in fulfillment of the request 202. At the conclusion of the rendering, the target device 108 may automatically terminate the lending of the target device resource 210, may release the target device resource 210 back to the target computing environment 110 (e.g., fading in any sound playing through the target computing environment 110), and may transmit a "lending complete" notification 604 to the host device 104, which may reverse the integration of the target device resource 210 with the host computing environment 106.

Figure 7:
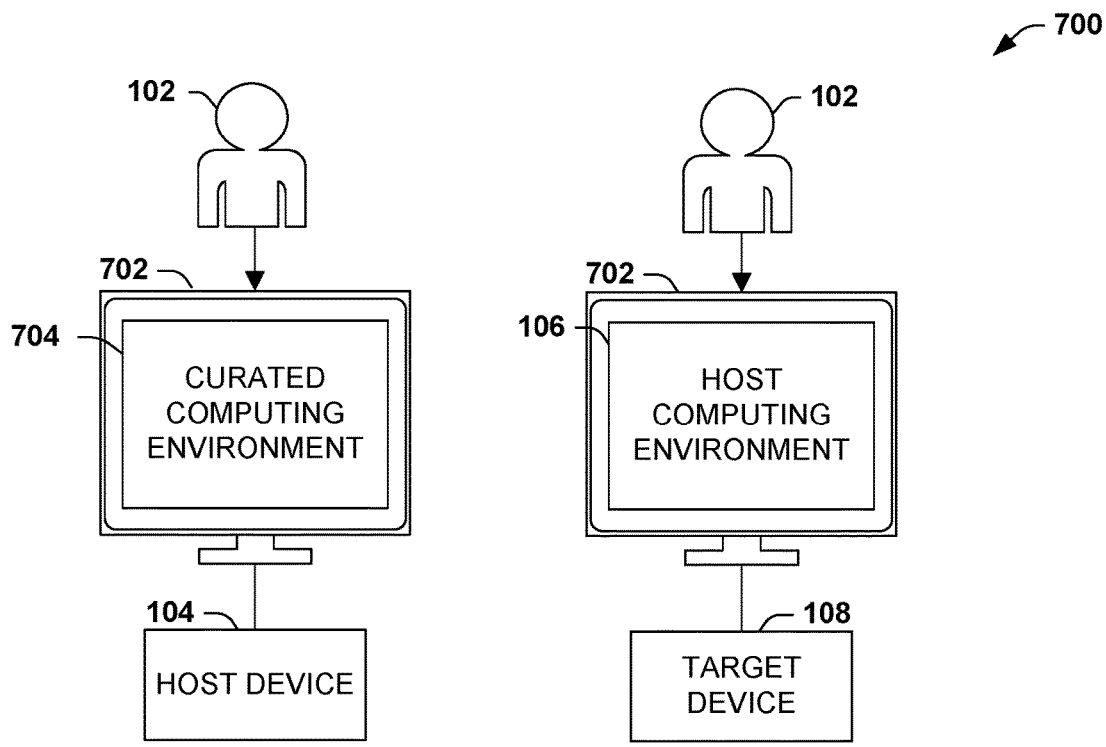
FIG. 7 is an illustration of an example scenario featuring a presentation of a curated computing environment on a host device and a presentation of a host computing environment on a target device, in accordance with the techniques presented herein.

FIG. 7 presents an illustration of an example scenario 700 featuring another variation in the borrowing of resources of a target device 108 by a host device 104, wherein the borrowing of resources of a target device 108 for use by a host device 104 is in furtherance of a borrowing of the host device 104 by a second user 102. In this example scenario 700, a first user 102 who is accessing the host computing environment 702 wishes to allow a second user 102 to borrow and access the host device 104, without interrupting the first user's interaction with the host computing environment 702. Accordingly, the first user 102 may borrow the resources of a target device 108, and may transmit the host computing environment to the target device 108. Additionally, the host device 102 may present to the second user 102 a curated computing environment 704 (e.g., a computing environment that is limited to the use for which the second user 102 requested to use the host device 104, such as an isolated web browser, a presentation only of a specific content item, or an execution of only a particular application on the host device 104). The second user 102 may therefore interact with the curated computing environment 704 on the host device 104 while the first user 102 continues to access the host computing environment 106 through the target device 108. The host device 104 and target device 108 may utilize many such variations in the lending of the target device resource 210 to the host device 104 in accordance with the techniques presented herein.

E3. Target Device Resource Integration with Host Computing Environment

A third aspect that may vary among embodiments of the techniques presented herein involves the manner of integrating the target device resource 210 with the host computing environment 106 of the host device 104.

As a first variation of this third aspect, the target device 108 may exclusively reserve the target device resource 210 for the host device 104, and may remove the target device resource 210 from a target computing environment 110 or mark the target device resource 210 as unavailable within the target computing environment 110. Alternatively, the target device 108 may non-exclusively reserve the target device resource 210, e.g., by sharing the target device resource 210 between the host device 104 and the target device 108. As one such example, the target device 108 may establish sharing criteria for sharing the target device resource 210 with the host device 104, e.g., directing target user input 134 to the target computing environment 110 in some circumstances and to the host computing environment 110 in other circumstances. As still another alternative, the target computing environment 110 may expose the target device resource 210 identically to the host device 104 and the target computing environment 110, e.g., mirroring input and/or output in both computing environments.

Figure 8:
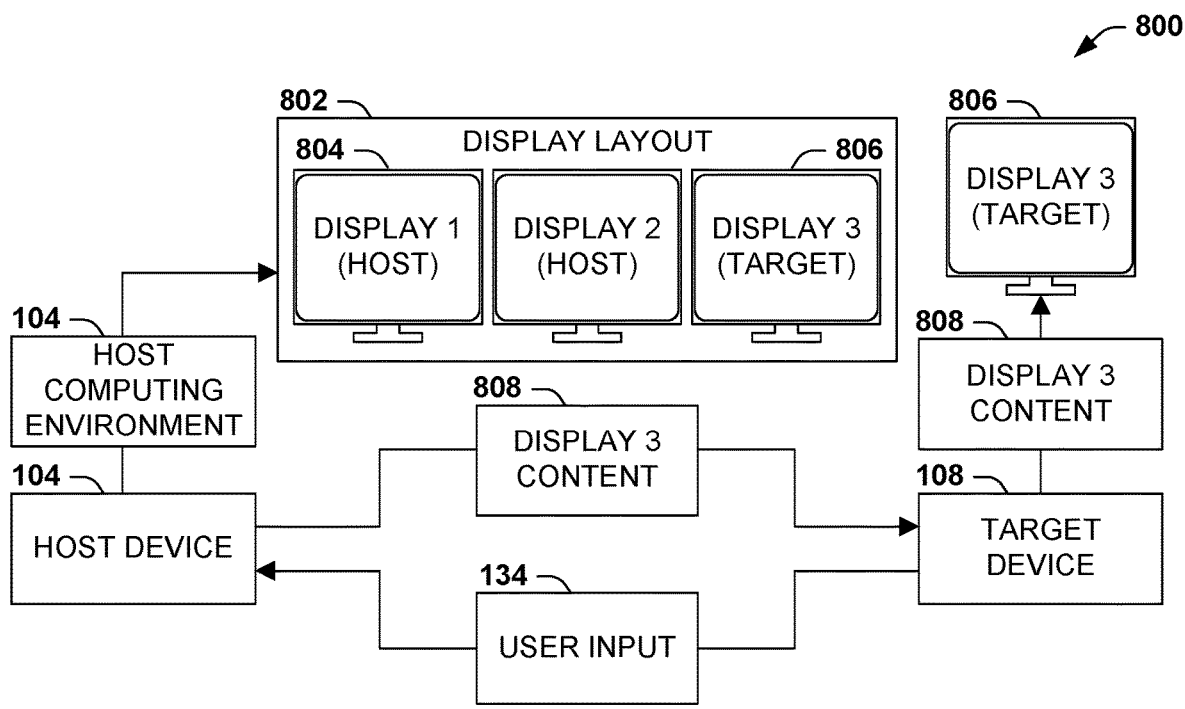
FIG. 8 is an illustration of an example scenario featuring an integration of a target display in a display layout of a host computing environment, in accordance with the techniques presented herein.

FIG. 8 presents an illustration of a second variation of this third aspect, wherein the target device resource 210 further comprises a target presentation component, and the host device 104 integrates the target device resource 210 with the host computing environment 106 by positioning the target presentation component relative to one or more host presentation components within a presentation component layout. In this example scenario 800, the target device 108 lends a target display 806 and target user input 134 to the host device 104, and the host device 104 integrates both the target display 806 and the target user input 134 with the host computing environment 106. In particular, the host computing environment 106 positions the target display 806 within a display layout 802, e.g., an extended desktop, relative to host displays 804 that are directly connected to the host device 104. The target user input 134 provided by the target device 108 may also span the displays of the display layout 802; e.g., the target device 108 may transmit the target user input 134 to the host device 104, which may apply the target user input 134 within the host computing environment 106. The host device 104 may then transmit display content 808 to the target device 108, which may present the display content 808 on the target display 806. In this manner, the target display 806 may be integrated with the host displays 804 of the host device 104 within the display layout 802 of the host computing environment 106. As another such example, a speaker layout may involve assigned positions and/or roles of speakers within an audio environment (e.g., a left-channel speaker, a right-channel speaker, and a center-channel speaker), and the host computing environment 106 may position a speaker of the target device 108 relative to other speakers of the host device 104 within the audio environment.

As a third variation of this third aspect, a host device 104 may, in the context of integrating the target device resource 210 of the target device 108 with the host computing environment 106 of the host device 104, inherently share some host device resources with the target device 108. As one such example, the target device resource 210 may further comprise a target presentation component, upon which the host device 104 endeavors to render a content item that is accessible over a network. In some such scenarios, the host device 104 may request the target device 108 to retrieve the content item from the network for presentation, but this request may utilize the target network resources of the target device 108. In the techniques presented herein, the host device 104 may instead retrieve the content item over a host network resource, and transmit it to the target device 108 for presentation through the target presentation component. This example may resemble "reverse internet connection sharing," wherein the host device 104, rather than requesting to use the target network resources of the target device 108, instead utilizes its host network resources to facilitate the interaction with the target device 108.

As a fourth variation of this third aspect, where the target device resource 210 further comprises a target presentation component, the host device 104 may integrate the target presentation component by transmitting at least a portion of the host computing environment 106 to the target device 108 for presentation through the target presentation component. For example, the host device 104 may transmit a complete rendering of the host computing environment 106, or only a portion thereof, such as a window of a specific application or a region of a host display where a content item is being displayed. A system of the target device 108 may further include a host environment presenter, which, responsive to receiving at least a portion of the host computing environment 106 from the host device 104, presents the host computing environment 106 through the target presentation component.

Further variations of this third aspect involve the manner in which the target device 108 adapts the target computing environment 110 while presenting at least a portion of the host computing environment 106.

Figure 9:
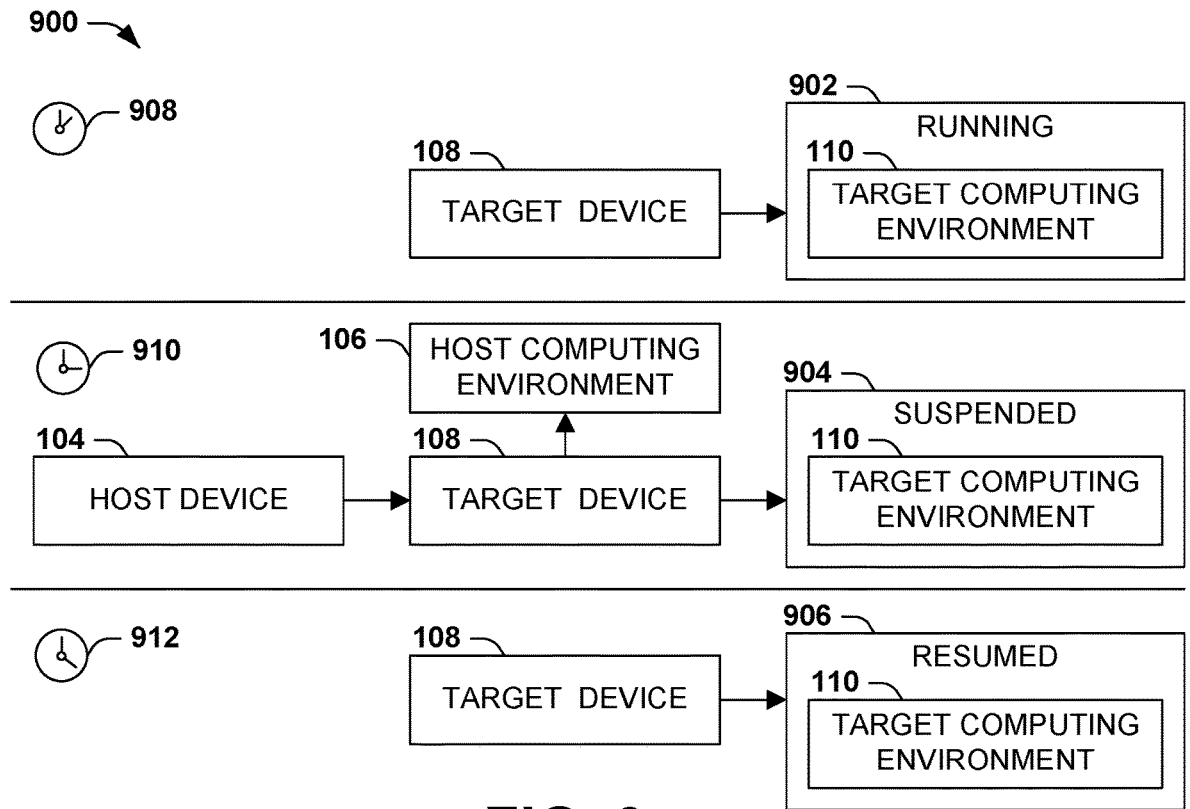
FIG. 9 is an illustration of an example scenario featuring a target device that presents of a host computing environment while preempting a presentation of a target computing environment of the target device, in accordance with the techniques presented herein.

FIG. 9 presents an illustration of an example scenario 900 featuring a fifth variation of this third aspect, wherein a target device 108 suspends a presentation of the target computing environment 110 on the target device 106 during the presentation of the host computing environment 106. In this example scenario 900, at a first time 908, the target device 108 is presenting the target computing environment 110 in a running state 902 through a target presentation component. At a second time 910, the target device 108 may receive a request 202 from a host device 104 to borrow the target presentation component for use by the host device 104 in order to present a host computing environment 106. The target device 108 may therefore initiate a suspension 106 of the target computing environment 110 on the target presentation component, and may then reserve the target presentation component for the presentation of the host computing environment 106. At a third time 912, upon detecting a completion of the presentation of the host computing environment 208 (e.g., a disconnection of the host device 104 from the target device 108), the target device 108 may initiate a resumption 906 of the target computing environment 110 on the target presentation component. This suspension of the target computing environment 110 while presenting the host computing environment 106 may be advantageous, e.g., for isolating the target computing environment 110 from the host computing environment 106 as a security feature, and also to promote the performance of the presentation of the host computing environment 106 on the target device 108. As one such example, if the target device 108 comprises limited computing resources, such as a low-powered mobile processor and a limited amount of memory, suspending the target computing environment 110 may enable the target device 108 to maximize the allocation of computing resources for the presentation of the host computing environment 106 to provide a responsive, low-latency user experience.

Figure 10:
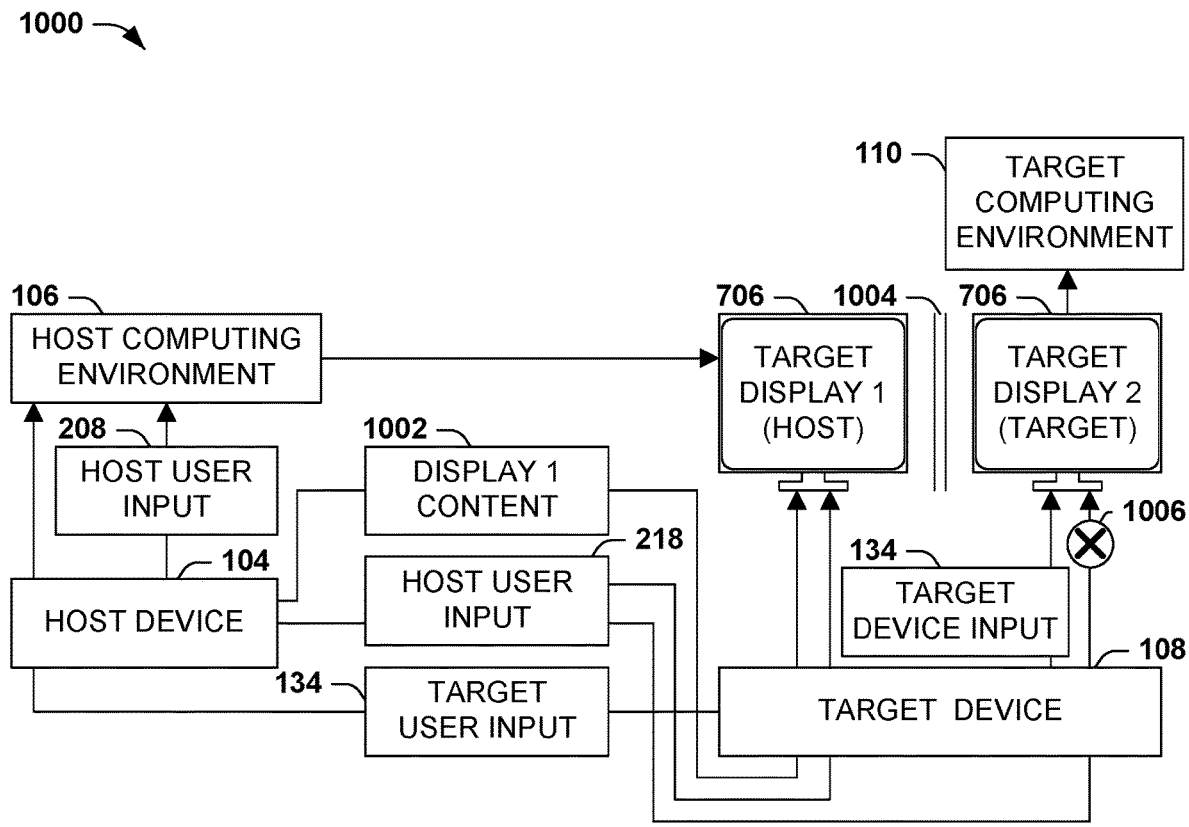
FIG. 10 is an illustration of an example scenario featuring a sharing of target device resources between a host computing environment and a target computing environment while isolating the target computing environment from the host computing environment, in accordance with the techniques presented herein.

FIG. 10 presents an illustration of an example scenario 1000 featuring a sixth variation of this third aspect, wherein the target device 108 does not suspend the target computing environment 110, but continues presenting the target computing environment 110 concurrently with a host computing environment 106. In this example scenario 1000, the host device 104 requests a target device 108 to borrow a target display 806 for the presentation of the host computing environment 106, and also the transmission of target user input 134 provided through an input component of the target device 108. Accordingly, the target device 108 may reserve a first target display 806 and an input component for the target user input 134, and may transmit the target user input 134 to the host device 104, which may apply it to the host computing environment 106 along with the target user input 134. The host device 104 may then transmit display content 1002 for the first target display 806 to the target device 108, and the target device 108 may present the display content 1002 on the target display 806. In this manner, the host device 104 enables the integration of the target user input 134 and the first target display 806 in the host computing environment 106, and enables a target device user and a host device user to use the host computing environment 106 together by providing user input through different devices. However, the target device 108 also continues to present the target computing environment 110 on a second target display 806 concurrently with presenting the host computing environment 107 on the first target display 806, and allows some of the target device input 134 to be applied to the target computing environment 110 and displayed upon the second target display 806, thus sharing the target device resource 210 among the host computing environment 106 and the target computing environment 110. In this example scenario 90, while the host device 104 implicitly transmits the host user input 218 back to the target device 108 as represented within the display content 1002 of the host computing environment 106, the model restricts 1006 the application of the host user input 218 from being incorporated in the target computing environment 110. In this manner, the model enables concurrent execution of the target computing environment 110 and the presentation of the host computing environment 106 on the first target display 806, while enforcing an isolation 1004 of the target computing environment 110 form the host user input 218. Many such scenarios may enable the integration of the target device resources 210 of the target device 108 with the host computing environment 106 in accordance with the techniques presented herein.

F. Computing Environment

Figure 11:
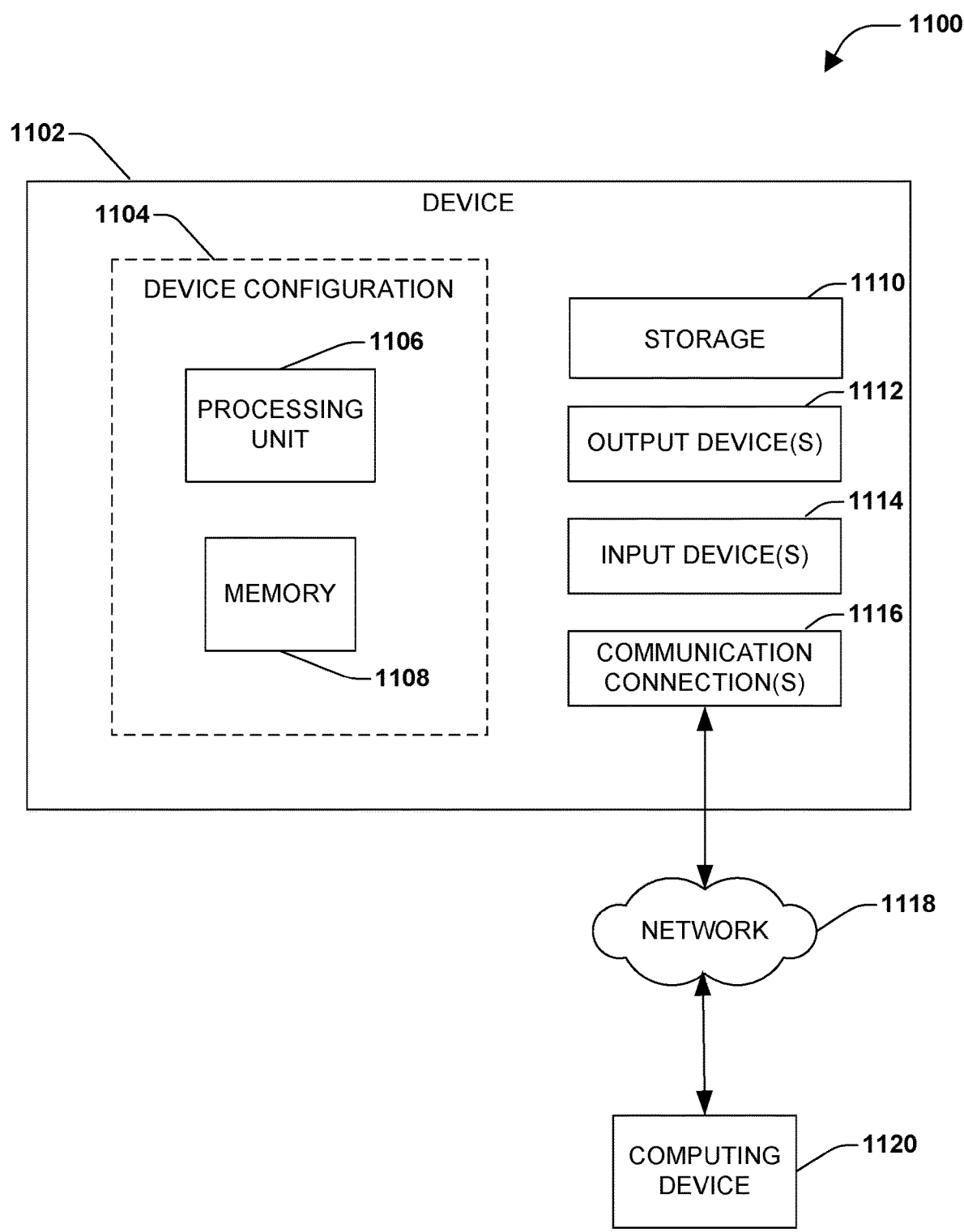
FIG. 11 is an illustration of an example computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1108 and storage 1110 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection, or other interfaces for connecting computing device 1102 to other computing devices. Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1114 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one embodiment, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 920 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A target device that fulfills a request to participate in a host computing environment of a host device, the target device comprising:
    a processor executing a target computing environment; and
    a target device presentation component provided within the target computing environment; and
    a memory storing instructions that, when executed on the processor, provide:
    a target device hardware resource advertiser that advertises an availability of the target device hardware resource; and
    a device resource lender that, responsive to receiving a request to borrow the target device presentation component for use in the host computing environment to display a rendering of at least a portion of the host computing environment:
        reserves the target device presentation component for the host computing environment;
        transmits to the host device an acceptance of the request;
        presents the rendering of at least a portion of the host computing environment using target device presentation component; and
        while presenting the at least a portion of the computing environment through the target presentation component, concurrently continues to execute the target computing environment on the target device.

2. The target device of claim 1, wherein:
the availability of the target device resource is constrained by an access credential; and
reserving the target device resource further comprises, responsive to receiving the access credential associated with the request:
verifying the access credential; and
only responsive to verifying the access credential, reserving the target device resource for the host computing environment.

3. The target device of claim 1, wherein:
the target device is operated by a target device user; and
the device resource lender, responsive to receiving the request to borrow the target device resource for use by the host device:
presents the request to the target device user; and
only responsive to receiving an acceptance of the request from the user, reserves the target device resource for the host computing environment.

4. The target device of claim 3, wherein:
the target device further comprises at least two target device resources for which the target device resource advertiser advertises an availability;
the request further specifies, among the at least two target device resources, a selected target device resource to lend to the host computing environment;
presenting the request to the target device user further comprises: presenting, associated with the request, an identification of the selected target device resource to lend to the host computing environment; and
reserving the target device resource further comprises: responsive to receiving the acceptance of the request from the user, reserving only the selected target device resource for the host computing environment.

5. The target device of claim 1, wherein the host environment presenter further isolates the target computing environment from the host computing environment presented on the target device.

6. The target device of claim 1, wherein the host environment presenter further shares the target device resource between the host computing environment and the target computing environment.

7. A target device that fulfills a request to participate in a host computing environment of a host device, the target device comprising:
    a processor executing a target computing environment; and
    a target device hardware resource provided within the target computing environment, wherein the target device resource further comprises a target presentation component; and
    a memory storing instructions that, when executed on the processor, provide:
    a target device hardware resource advertiser that advertises an availability of the target device hardware resource; and
    a device resource lender that, responsive to receiving a request to borrow the target device hardware resource for use in the host computing environment:
        presents the request to the target device user including specifying a content item identified in the request to be presented on the target presentation component of the target device;
        reserves the target device hardware resource for the host computing environment;
        transmits to the host device an acceptance of the request; and
        provides the target device hardware resource for integration with the host computing environment of the host device on par with other devices that are physically or wirelessly directly connected to the host device.

8. The target device of claim 7, wherein the device resource lender, responsive to detecting a completion of presenting the content item on the target presentation component, releases a reservation of the target device resource for the host computing environment.

9. A method of fulfilling a request to a target device to participate in a host computing environment of a host device, the method comprising:
    advertising an availability of a target device hardware resource;

receiving a request to borrow the target device presentation component for use in the host computing environment to display a rendering of at least a portion of the host computing environment; and responsive to receiving the request to borrow the target device resource:
- reserving the target device presentation component for the host computing environment;
- transmitting to the host device an acceptance of the request;
- presenting the rendering of at least a portion of the host computing environment using target device presentation component; and
- while presenting the at least a portion of the computing environment through the target presentation component, concurrently continuing to execute the target computing environment on the target device.

10. A memory device storing instructions that, when executed on a processor of a target device, cause the target device to fulfill a request to participate in a host computing environment of a host device, by:

advertising an availability of a target device presentation component;

receiving a request to borrow the target device presentation component for use in the host computing environment; and responsive to receiving the request to borrow the target device presentation component:
- reserving the target device presentation component for the host computing environment;
- transmitting to the host device an acceptance of the request;
- presenting the rendering of at least a portion of the host computing environment using target device presentation component, and
- while presenting the at least a portion of the computing environment through the target presentation component, concurrently continuing to execute the target computing environment on the target device.

* * * * *